(12) United States Patent (10) Patent No.: US 9,020,868 B2
Elkins et al. (45) Date of Patent: Apr. 28, 2015

(54) DISTRIBUTED ANALYTICS METHOD FOR CREATING, MODIFYING, AND DEPLOYING SOFTWARE PNEURONS TO ACQUIRE, REVIEW, ANALYZE TARGETED DATA

(71) Applicant: Pneuron Corp., Nashua, NH (US)

(72) Inventors: Elizabeth Winters Elkins, Pompano Beach, FL (US); Douglas Wiley Bachelor, Groton, MA (US); Simon Byford Moss, Cos Cob, CT (US); Thomas C. Fountain, Madison, NJ (US); Raul Hugo Curbelo, Sturbridge, MA (US)

(73) Assignee: Pneuron Corp., Nashua, NH (US)

( * ) Notice: Subject to any disclaimer, the term of this patent is extended or adjusted under 35 U.S.C. 154(b) by 398 days.

(21) Appl. No.: 13/713,624

(22) Filed: Dec. 13, 2012

(65) Prior Publication Data

US 2013/0166490 A1 Jun. 27, 2013

Related U.S. Application Data

(63) Continuation-in-part of application No. 12/870,348, filed on Aug. 27, 2010.

(60) Provisional application No. 61/569,983, filed on Dec. 13, 2011.

(51) Int. Cl.
*G06E 1/00* (2006.01)
*G06N 5/02* (2006.01)

(52) U.S. Cl.
CPC . *G06N 5/02* (2013.01); *G06N 5/022* (2013.01)

(58) Field of Classification Search
CPC .............. G06Q 10/063; G06Q 10/067; G06Q 30/0201; G06F 17/30867
USPC ................................. 706/12, 45, 62
See application file for complete search history.

(56) References Cited

U.S. PATENT DOCUMENTS 7,685,083 B2 3/2010 Fairweather
8,069,242 B2 11/2011 Hadar et al.
(Continued)

FOREIGN PATENT DOCUMENTS

JP 2004-538542 12/2004
JP 2005-520224 7/2005
JP 2006-73007 3/2006

OTHER PUBLICATIONS

International Search Report and Written Opinion, PCT/US2013/050673, mailed Mar. 4, 2014, 7 pages.
(Continued)

*Primary Examiner* — David Vincent
(74) *Attorney, Agent, or Firm* — Thompson Hine, LLP

(57) ABSTRACT

A method and system for the integration of disparate data stored within an Information Technology infrastructure of a company is provided. The system and method enables holistic, real time control of data discovery, retrieval and analysis. The system combines data mining, retrieval and analytics at the source of the data, thereby solving traditional problems with disparate and distributed data, systems, business processes and analytics across an organization. The system enables a user to configure and target data, then apply rules, workflows and analytics from one central source. This process is accomplished by distributing functions in the form of software pneurons against the existing infrastructure for maximum processing while preserving a robust and extendable suite of definitions. The system uses the existing application, network and hardware assets and enables connection to the native data, maps only the data fields that need to be mapped to carry out the desired analysis, runs the analysis and then returns the data to a central location to be assembled, analyzed, organized and/or reported.

4 Claims, 20 Drawing Sheets

(56) References Cited

U.S. PATENT DOCUMENTS

| | | | |
|---|---|---|---|
| 2002/0029340 A1 | 3/2002 | Pensak et al. | |
| 2002/0131374 A1 | 9/2002 | Lee | |
| 2002/0161624 A1* | 10/2002 | Bradlee | 705/10 |
| 2003/0005030 A1* | 1/2003 | Sutton et al. | 709/200 |
| 2003/0033265 A1* | 2/2003 | Cabana et al. | 706/15 |
| 2003/0058277 A1 | 3/2003 | Bowman-Amuah | |
| 2004/0122937 A1 | 6/2004 | Huang et al. | |
| 2005/0090908 A1 | 4/2005 | Tamura | |
| 2005/0149459 A1 | 7/2005 | Kofman et al. | |
| 2005/0234799 A1 | 10/2005 | Hansen et al. | |
| 2006/0184410 A1 | 8/2006 | Ramamurthy et al. | |
| 2006/0242155 A1 | 10/2006 | Moore et al. | |
| 2007/0078692 A1 | 4/2007 | Vyas | |
| 2007/0094168 A1* | 4/2007 | Ayala et al. | 706/15 |
| 2007/0136264 A1* | 6/2007 | Tran | 707/4 |
| 2008/0133287 A1 | 6/2008 | Slattery | |
| 2008/0201655 A1* | 8/2008 | Borchardt et al. | 715/767 |
| 2009/0030860 A1* | 1/2009 | Leitheiser | 706/20 |
| 2009/0113049 A1 | 4/2009 | Nasle et al. | |
| 2009/0254572 A1 | 10/2009 | Redlich et al. | |
| 2010/0064033 A1 | 3/2010 | Travostino et al. | |
| 2010/0070448 A1* | 3/2010 | Omoigui | 706/47 |
| 2010/0070600 A1 | 3/2010 | Schulzrinne et al. | |
| 2010/0070689 A1* | 3/2010 | Lee et al. | 711/103 |
| 2010/0077205 A1 | 3/2010 | Ekstrom et al. | |
| 2010/0189099 A1 | 7/2010 | Bae et al. | |
| 2010/0250497 A1 | 9/2010 | Redlich et al. | |
| 2010/0293123 A1 | 11/2010 | Barrett et al. | |
| 2011/0055109 A1* | 3/2011 | McGrath | 705/348 |
| 2011/0131589 A1 | 6/2011 | Beaty et al. | |
| 2011/0227754 A1 | 9/2011 | Hill | |
| 2012/0102103 A1 | 4/2012 | Jacobson et al. | |
| 2012/0259909 A1* | 10/2012 | Bachelor et al. | 709/201 |
| 2013/0086039 A1 | 4/2013 | Salch et al. | |
| 2013/0086064 A1 | 4/2013 | Salch et al. | |
| 2013/0091122 A1 | 4/2013 | Salch et al. | |
| 2014/0012867 A1* | 1/2014 | Moss et al. | 707/756 |

OTHER PUBLICATIONS

XMLNews.org, XML Basics, 1999, available at http://web.archive.org/web/20120627074440/http://xmlnews.org/docs/xml-basics.html, 6 pages.

Japanese Notice of Reason(s) for Rejection, Translation, JP2012-527026, mailed Feb. 4, 2014, 3 pages.

International Preliminary Report on Patentability PCT/US2012/069483, issued Jun. 17, 2014, 5 pages.

International Search Report and Written Opinion, PCT/US10/46971, mailed Nov. 23, 2010, 8 pages.

International Preliminary Report on Patentability, PCT/US10/46971, issued Feb. 28, 2012, 4 pages.

International Search Report and Written Opinion, PCT/US12/32726 mailed Aug. 17, 2012, 6 pages.

International Preliminary Report on Patentability, PCT/US12/32726 issued Oct. 8, 2013, 5 pages.

International Search Report and Written Opinion, PCT/US2012/069483, mailed Mar. 22, 2013, 7 pages.

Singapore Search Report, SG201201374-4 mailed Oct. 4, 2013, 6 pages.

Singapore Written Opinion, SG201201374-4 mailed Oct. 4, 2013, 10 pages.

Zhang et al., Migrating Legacy Applications to the Service Cloud, Object Oriented Programming, Systems, Languages and Applications (OOPSLA), 2009: Towards best practice in Cloud Computing. (2009) 59-68.

Sneed, Encapsulation of legacy software: A technique for reusing legacy software components, Annals of Software Engineering 9 (2000) 293-313.

* cited by examiner

DISTRIBUTED ANALYTICS METHOD FOR CREATING, MODIFYING, AND DEPLOYING SOFTWARE PNEURONS TO ACQUIRE, REVIEW, ANALYZE TARGETED DATA

CROSS-REFERENCE TO RELATED APPLICATIONS

This application claims priority from U.S. Provisional Patent Application Ser. No. 61/569,983 entitled "Pneuron Distributed Analytics" which was filed on Dec. 13, 2011, and U.S. patent application Ser. No. 12/870,348 entitled "System and Method For Employing The Use of Neural Networks For the Purpose of Real-Time Business Intelligence and Automation Control" which was filed on Aug. 27, 2010 both of which are incorporated fully herein by reference.

TECHNICAL FIELD

The present invention relates to a method and system for the integration of software applications within the Information Technology (IT) infrastructure of companies of all sizes and more particularly, to a system and method for providing holistic, real-time control of and extract data from such software applications and perform analytic evaluation and generation of the results.

BACKGROUND INFORMATION

Organizations are fragmented in their ability to understand customers, opportunities and risks. Organized by function, line of business or geography, the modern enterprise has numerous silo-based systems that are purpose-built, but inflexible in their functional evolution or compatibility with other critical systems within and outside (i.e. web sites, affiliated organization, etc.) the organization. Organizations often embark on expensive projects to leverage and correlate complex and diverse data across these systems. What is typically required in these projects is to extract, transform, and consolidate all of the remotely located data to a central point and to prepare and organize the data in one format.

This process typically involves the procurement of large central databases, middleware, data model projects, or potentially the wholesale replacement of existing point systems that expose critical data. Unfortunately, the results of these projects are usually marginal at best. At worst, these projects institutionalize poor quality, inflexibility, lack of value and unnecessary risk. Too often, because of the high cost of accessing the desired data required by the project or task, important data remains in departmental or application-based silos, preventing access to and sharing of information that should and could be used to make real time decisions. Most importantly, it has been determined that approximately $0.80 of every project dollar is spent in preparing data to run an analysis. Thus, in order to get value and business intelligence from an organization's data which may be spread out over several departments or locations, a significant upfront investment in effort, cost, and time is required.

Accordingly, what is needed is a solution that allows an organization to identify and extract valuable business data in real time over multiple platforms and locations but which does not require moving data to a central data repository but rather, which distributes the desired analytical capabilities to where the data is resident. In this manner, the data can be analyzed in its native form versus having to normalize or standardize it as is required in the prior art.

SUMMARY OF THE INVENTION

The present invention offers a unique solution that finally addresses the traditional problems associated with disparate and distributed data, systems, business processes and analytics across an organization. The invention describe herein is specifically designed to achieve a completely distributed approach that combines data and analytics at the source, all while respecting enterprise security, performance standards and integrity of results.

The invention's simple to deploy processing framework provides organizations with the ability to easily configure and target data, then apply rules, workflows and analytics from one central source. This is accomplished by distributing functions (distributing pneurons) against and within the existing infrastructure for maximum processing, while preserving a robust and extendable suite of definitions.

In short, the present invention combines data acquisition, rules, and analytics together, and then distributes them seamlessly across the enterprise using existing application, network and hardware assets, to where the data is located. Each pneuron connects to the native data, maps only the data fields that need to be mapped to carry out the desired analysis, runs the analysis and assembles the data results across the distributed pneurons. The pneuron by definition is deployed and runs on the remote location's existing hardware and enables the interaction and use of third party analytics products such as products available from Lotus, Microsoft Excel, SAS, Cognos and Tibco Spotfire. This is vastly different from the traditional alternative, which is an expensive and cumbersome deployment of multiple tools and a focus on a very monolithic and custom data model for acquisition, analysis and presentation. In contrast, the present invention allows a user to selectively target all of these components together and combine them across the enterprise as one holistic and integrated view of data, rules, analytics and results.

The invention is uniquely designed to help organizations overcome this fragmentation and react quickly to the challenges and opportunities that drive their organization's success: compliance with new and evolving regulations, integration of new or inherited systems often obtained through mergers and acquisitions, reduction of resource or system costs across the organization, and development of new products and services to improve top-line growth and competitiveness in the market.

To achieve these goals, the present invention has completely shifted the traditional approach taken by current Business Intelligence (BI) or business application development, deployment and maintenance projects, which are extremely inefficient in Total Cost of Ownership (TCO) and Return on Investment (ROI). In fact, the solution according to the present invention allows organizations to move away from the traditional costly requirements for data normalization, centralized databases, the imposition of multiple alien, abstract and incompatible data models, all of which result in 80 cents on the dollar spent in preparation for, rather than creation of, value.

The invention offers a ground-breaking technology that accelerates, by orders of magnitude and a fraction of the cost, the creation, deployment and management of data, analytics, and operational best practices, allowing organizations to achieve critical, real time connection of their global enterprise.

Below, without limitations, are just a few of the business benefits of the invention solution:

Value Positioning

Real-time market awareness and visibility is achieved by connecting intelligence, both internal and external to the organization, creating true organizational differentiation. Single-view of the customer is derived in order to more effectively target products and services and drastically improve customer support. Product development, legacy system longevity, increased operational intelligence and new operating models are realized at a faction of the time, cost and risk previously experienced. Best practices and common standards are seamlessly distributed, maximizing operational excellence and leverage.

Operational and Risk Management

Effectively connect, manage and report on diverse elements of risk exposure—financial, project, and operational—without the costs that have traditionally deterred projects directed at creating organizational transparency. Risk and Integrity Management become foundational to operational management, rather than a "cost of doing business. Capital optimization, regulatory reporting, compliance, audit, activity sensitivities and performance indicators become real time management levers and standards rather than reactive dated reports.

Deployment

Project business cases are no longer considered large-dollar ticket items; rather, they are small, incremental, controlled, interconnected and linked directly to a clear measurable business challenge. Seamlessly blend any number of legacy applications, processes and data sources in order to extend the value of existing infrastructure, applications and tools. A common, simple and clear deployment approach gives Business and IT the ability to gain critical consensus, resulting in unprecedented combined organizational leverage.

Accordingly, the present invention provides several features including the ability to interrogate data; connect to the data and analyze it, run predictions or any other different forms of analysis without the movement and normalization of the data. The system runs on the existing hardware where the data is located. Moreover, if the user wishes to perform additional data analysis after a previous data analysis, additional data does not have to be moved or normalized but the user simply deploys a new pneuron to perform the new analysis desired. Finally, the present invention allows for encapsulation or direct interaction of third-party analytic products and distributing such analytic products directly to the source of the data desired to be analyzed.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Technical Value Points

Figure 1A:
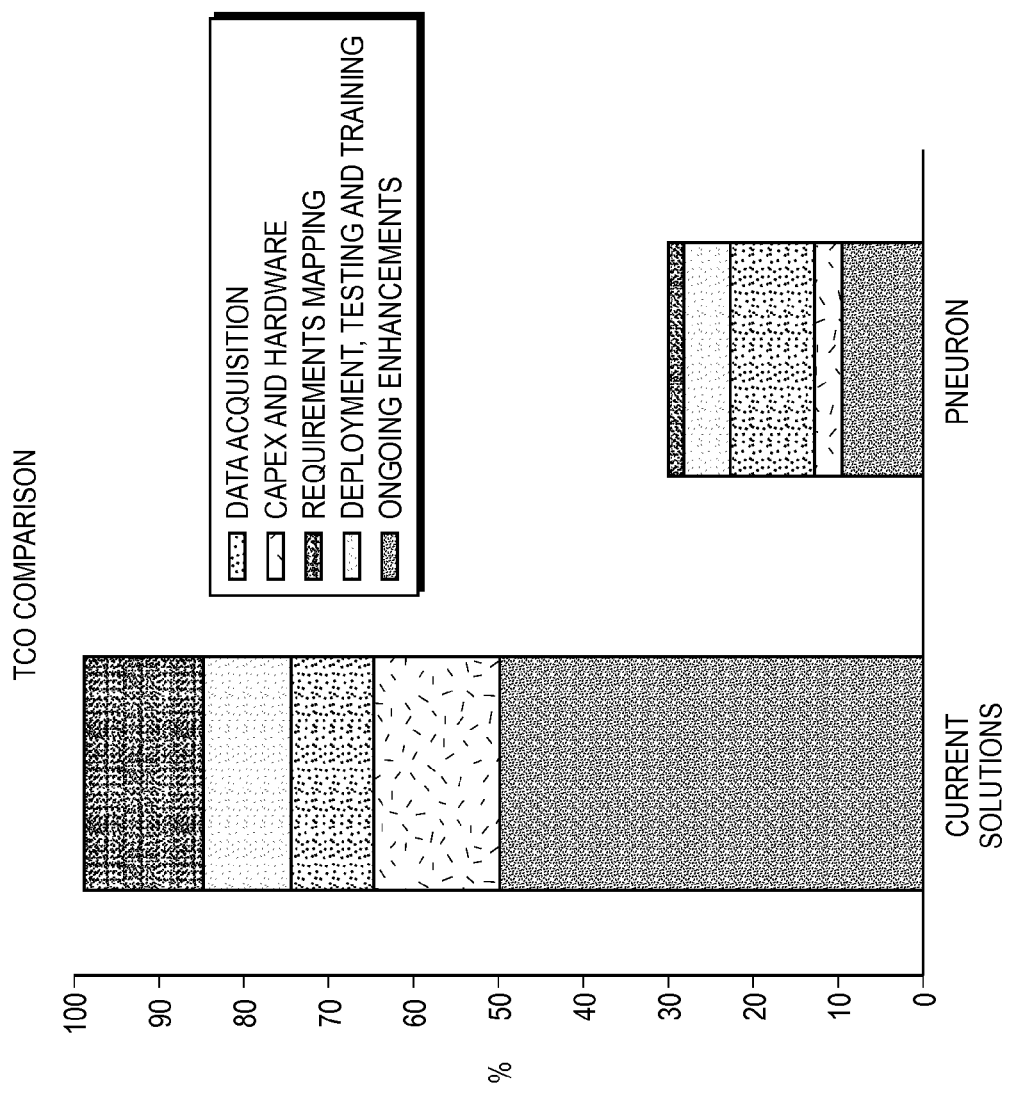
FIGS. 1A and 1B are a chart and graph respectively illustrating the value comparison for the approach utilizing the present invention versus the traditional model.

The present invention features an innovative approach for working with critical systems, data and infrastructure within complex and distributed organizations. The invention is uniquely designed to seamlessly overlay existing systems and acquire targeted information from these systems or data stores.

The evaluation of information can now occur in real-time, enabling adjustments on-demand and presenting immediate visualization of results. Ease of configuration ensures that our clients can continuously adapt models, recast analytics and evaluate results immediately under multiple scenarios, risk tolerances or operational SLAs.

The highly distributed and parallel processing infrastructure enables organizations to distribute pneuron instances in close proximity to or on the target systems, and allows local processing, acquisition, and evaluation without aggregating and normalizing all of the enterprise information. This approach facilitates incremental and phased delivery of targeted information and intelligence. All configuration information is managed in the pneuron database and can be applied to creating a "best practices" suite of models that can be readily adapted to other activities and clients.

Consistent with the core invention principles, the build-out of the platform of the invention incorporates the following key features:

Distributed architecture—allows critical functions to be performed at the source rather than through layers of migration, translation, and normalization. This eliminates costly pre-processing of data integration and ongoing normalization challenges Resiliency—robust performance via discovery, access, and use of available processing resources in a distributed, application-clustered, and fault-tolerant framework;

Elastic execution—supports scalability and seamless access/provisioning/use of processing resources within and outside an enterprise;

Lightweight footprint—optimizes system resources by allocating pneurons only when processing is required, limits impact on existing processing infrastructure, allows local processing by hosting functionality on source system servers, and minimizes requirements for added infrastructure investment;

Service self-awareness—speeds up enterprise-wide integration and allows for many-to-many service integration;

Instrumentation—capability for both operational and business process performance monitoring to allow analysis and follow-on optimization;

Higher level, Business Oriented, Integrated platform—combines the design/build/deploy/run activities of the solution to simplify environment setup, integration, configuration, and tuning; provides for a single intuitive interface for business and technical users;

Security & Governance integration—provides simple integration with existing security policies and governance models;

Selective Data Acquisition: Target only the information required to solve a business problem and build on that foundation to any level of complexity. Data can be selectively acquired as well as updated across target systems;

Distribute Processing to Target Systems: Deploy remote Pneuron instances in proximity to target systems, perform the acquisition and evaluation at the local level and marshal selected source and intelligence results in real time;

Tailored Clustering and Fault Tolerance: Processing is clustered and configured to enable automatic concurrency and increases in Pneuron instances based on load. Clusters are reformed dynamically based on workload and health of the system;

Combine and Evaluate Information: Combine multiple data acquisition results and evaluate at runtime without normalization of information, all using a meta-data virtualization model;

Automated Cross Referencing: Match and evaluate common information and align to a common standard;

Configure Use Cases, Analytics, and Rules into Shared Services and Functions: Target only the information required for specific use cases and scenarios;

Visualize Results and Modify Selectively: Visualize real-time results and apply changes to recast and evaluate. Pass results to any client or third party target system for seamless integration into the current application environment;

Enable SME Configuration and Management: Work with intuitive GUI tools for configuration and management, minimizing pressure on IT resources. Enable a streamlined and incremental methodology for configuration, testing, and deployment. High availability, performance optimization, load management, DR and security inherently handled by the Pneuron "Cortex";

Maintain Configuration Library: All information is maintained in the database and can be exported and applied for future use, enabling organizations to establish and build upon an IP base for future clients and expanded client initiatives. Best practices models and organizational simplification can be realized quickly and effectively;

Automate Workflows and Activities: Manual intervention activities can be configured and automated to perform activities programmatically; and Automate Logging and Audit: Record all activities performed automatically with audit details on each acquisition, use case, and results for future reference.

In literally every aspect of a project's lifecycle, these value points radically improve organizational TCO and ongoing ROI versus traditional approaches.

Figure 1B:
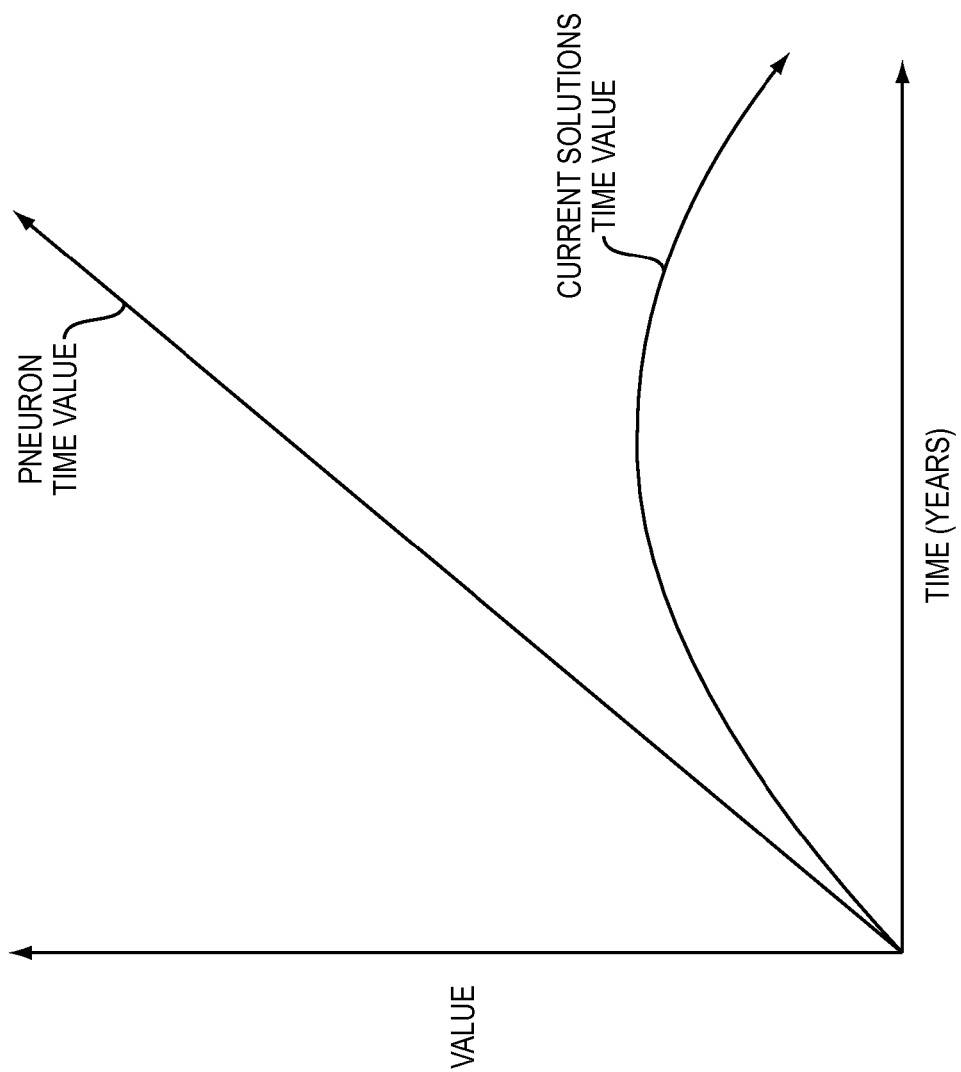

The illustration in FIGS. 1A and 1B recaps the value comparison for the approach utilizing the present invention versus the traditional model, and highlights the intrinsic benefits of the invention—the stimulation of constant enterprise intelligence rather than declining value and replacement. According to the current solution, designs degrade in performance and value as volume and complexity grows. Functional value becomes antiquated or a huge code-line base over time as requirements and user demands evolve, creating stagnation or over-reliance on vendor roadmap/costly customization. In contrast, the present invention provides intelligence segments that are easily and continuously updated in real-time. Additionally, services allow for continuous creation of new products, output and models as business evolves and new data or product demands are invented. No replacement is required. Just constant business driven enhancements and innovations.

Data Acquisition, Aggregation, and Processing Continuum

The primary vendors involved in business intelligence (BI) and data acquisition focus on a model that requires detail evaluation of all systems, implementation of extraction, transformation, and loading (ETL) programs, acquisition of all enterprise information and mapping and normalization of data into an aggregated data warehouse. As a result, most organizations also adopt this model as the defacto standard when building internal systems to aggregate and combine all information. The present invention offers a unique set of innovations that shift the paradigm in managing Distributed Analytics. Information can be selectively targeted at runtime, processed and evaluated without extracting all information and normalizing the data in a large aggregated data warehouse.

Figure 2:
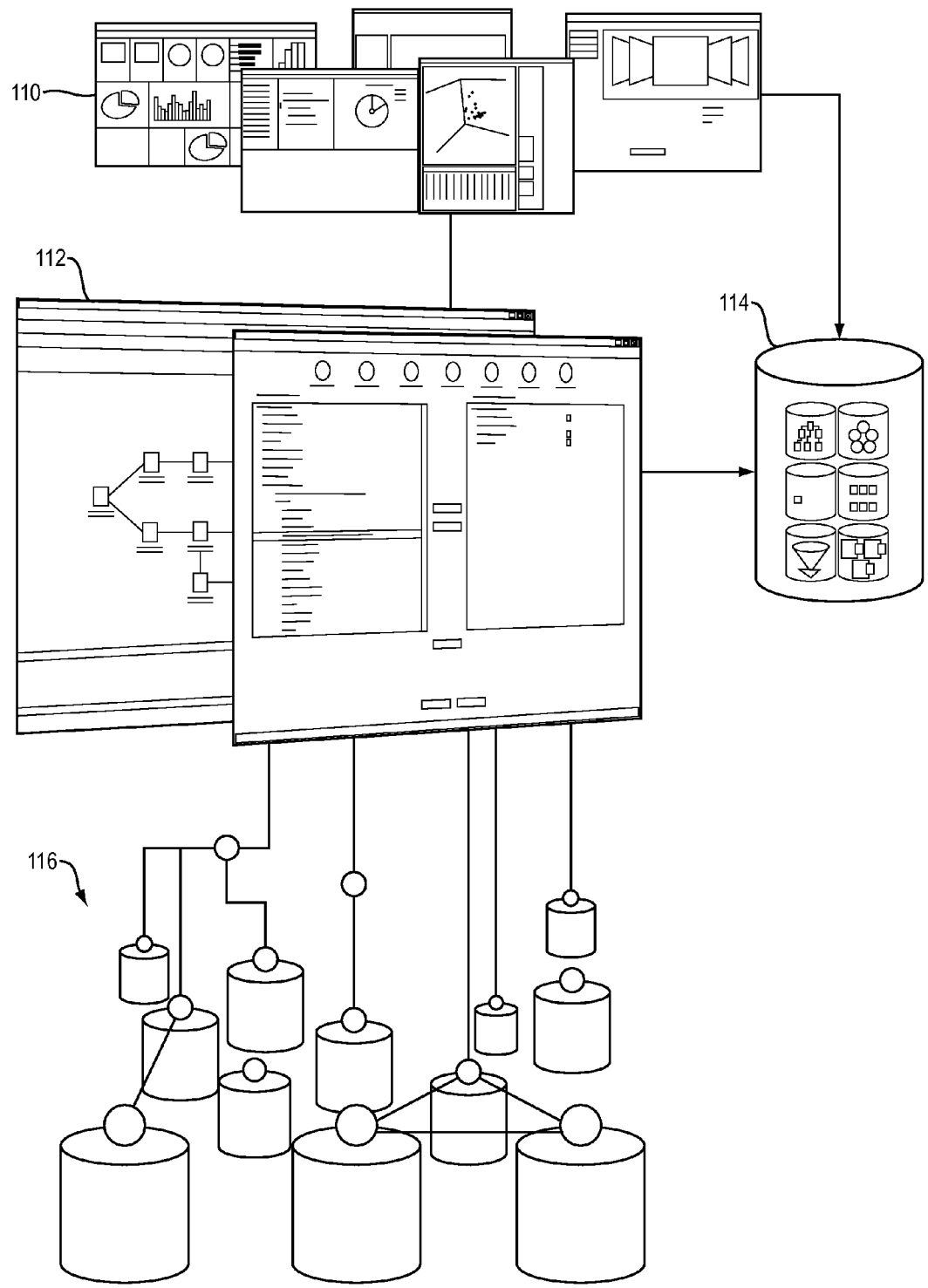
FIG. 2 is a diagram illustrating the operational parameters of the system and method of the present invention.

The model according to the present invention shown in FIG. 2 offers a profound new approach to (Business Intelligence) BI 110, enterprise transparency and the resulting Total Cost of Ownership (TCO) challenges that hinder enterprise competitiveness namely, taking analytics to the data to finally realize enterprise transparency. There is no alien or abstract data model dependency, with full leverage of existing BI investments and Intellectual Property (IP). The database becomes a repository 114 of results and solutions rather than a slow and expensive source for raw enterprise data. The invention is agile, real-time, and cost effective in deployment and ongoing maintenance.

Unlike conventional data acquisition in enterprise applications that require normalized databases for efficient retrieval and processing, the present invention allows application designers to create custom data acquisition networks (pneurons) that do not require normalized data. These data acquisition networks can be a single query pneuron or a complex sub network constructed using simple query pneurons augmented with data from a completely different database using a matching pneuron, thereby creating a virtual relationship and linkage between the two potentially disparate databases in real time.

Data acquisition is selective and focused at obtaining targeted information from different systems. Data acquisition is organized by type, including database, application programming interface (API) or service interaction, and file. Specialized pneurons 116 are implemented for each data acquisition type in order to assist clients with easily configured access, regardless of source type; e.g. DB, Service, File Pneuron.

These pneurons are configured for each data source and system, and become a function of configuration rather than creation. The configuration focuses on selective data acquisition specific to the pneuron network it will "reside" in, and workflow, and can obtain what is required in real-time. This, among other features of the present invention, is in direct contrast to traditional systems which obtain, normalize, and consolidate the total information in a delayed model.

Pneuron data acquisition networks can also be built to gather and process data as a scheduled operation, based on client preference or business process. These networks can easily be modified to include additional data sources to strengthen existing queries. Pneuron data networks, which are created in the Design Studio 112, provide a flexible and efficient approach to add, modify or delete sources or attributes during the data gathering phase. In addition to acquiring information, the Pneurons can selectively update target systems of record with evaluated information, enabling synchronization of information where necessary.

Finally, the complexity associated with most traditional acquisitions in enterprise applications can be daunting, often requiring an organization to construct and run complex queries with multiple levels of nesting and joins in real time or scheduled mode on a centralized database or warehouse. This increases the cost and time of execution and is inefficient as the dataset inevitably grows larger. The pneuron data acquisition model of the present invention provides greater flexibility by breaking down complex queries into smaller coordinated queries that can be triggered at individual sources in real-time or in scheduled mode, thereby decreasing the cost and time of execution.

Intuitive Thin Client Pneuron Graphical User Interface

The present invention includes a suite of Rich Internet Architecture (RIA) applications using the Google Web Toolkit (GWT) and Smart Client. The applications are thin client and managed from the Pneuron server, requiring no client applications to be installed on the client computers.

Pneuron provides an intuitive, graphical tool suite that enables business and subject matter experts to define and configure the Pneurons and Pneuron Networks. Graphical configuration tools are provided to define the data access configuration. The data acquisition SQL and API service calls are generated automatically and can be adjusted. This approach minimizes the requirement of internal IT resources, including DBAs and programmers.

Figure 3A:
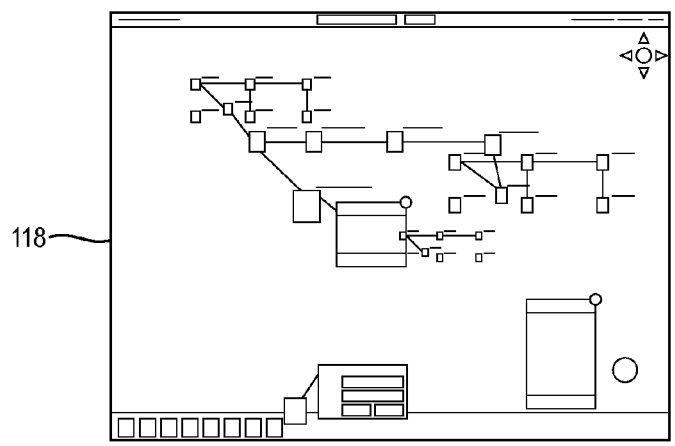
FIG. 3A is a screen shot of the design studio feature of the present invention.
Figure 3B:
FIG. 3B is a screen shot of the heads-up display feature of the present invention.
Figure 3C:
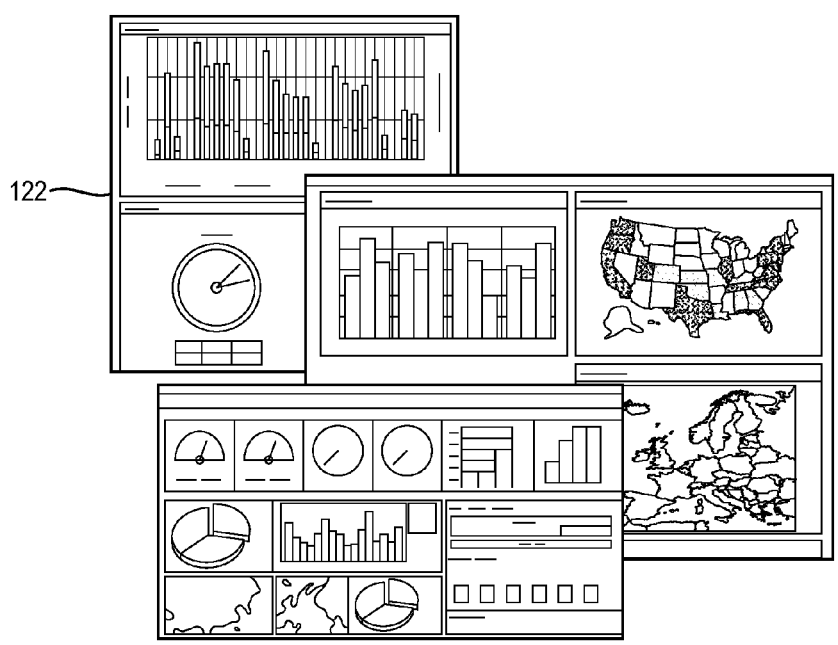
FIG. 3C is a screen shot of the enterprise control manager feature of the present invention.

FIGS. 3A, 3B and 3C describe in greater detail some functionalities of the present invention utilizing some screen shots. For example, the design studio 118 shown in FIG. 3A allows the user or a team of users to centrally design, develop integrate, deploy across enterprise data sources and systems, and manage from a single user interface. The design studio provides for end-to-end integration, business intelligence and distribution for the creation of pneuron intelligence networks across the entire enterprise data and application environment.

The design studio also provides the ability to organize multiple pneurons together into a processing plan (neuron network). Tailored editors for each type of pneuron are also provided. The definition of each pneuron is stored in a pneuron database while simulation and testing of a pneuron network and adjustments thereto may be provided.

The heads up display 120 shown in FIG. 3B provides floating real-time information. Visualization widgets integrated with any legacy or third-party application is also provided by the heads up display. The heads up display also provides incremental information, such as data, from other systems as well as analysis, third-party or workflow information and automatically interfaces with and updates the legacy or third party application Finally, the enterprise control manager 122 shown in FIG. 3C provides a suite of tools with interactive ability to perform what-ifs and to recast results instantaneously. Easy to use graphical tool sets enable business users and the subject matter specific experts to visually configure, test, and deploy pneurons and pneuron networks specific to each business with no or minimal programming and customization.

Figure 4:
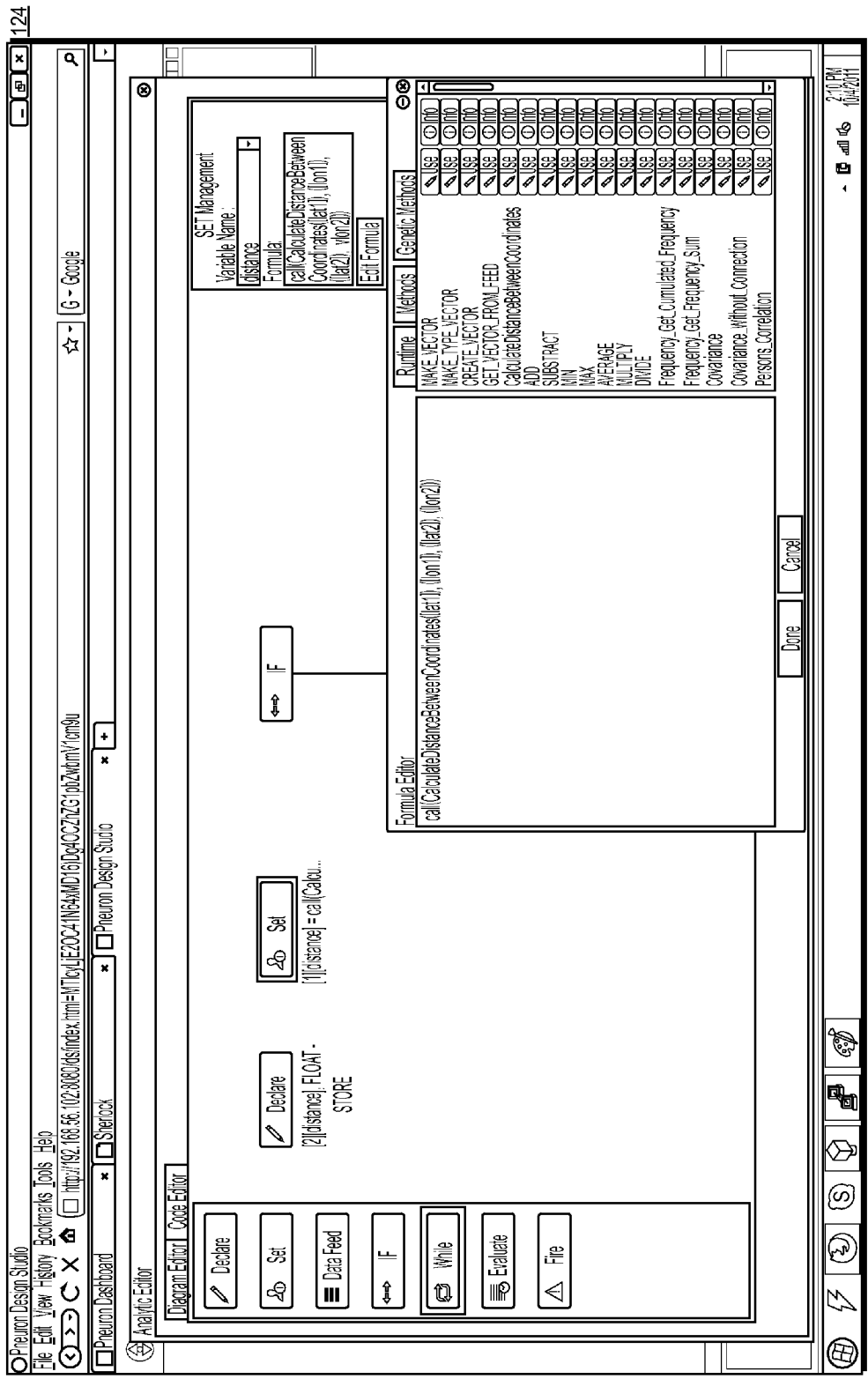
FIG. 4 is a screen shot of the data base data acquisition editor according to another feature of the present invention.
Figure 5:
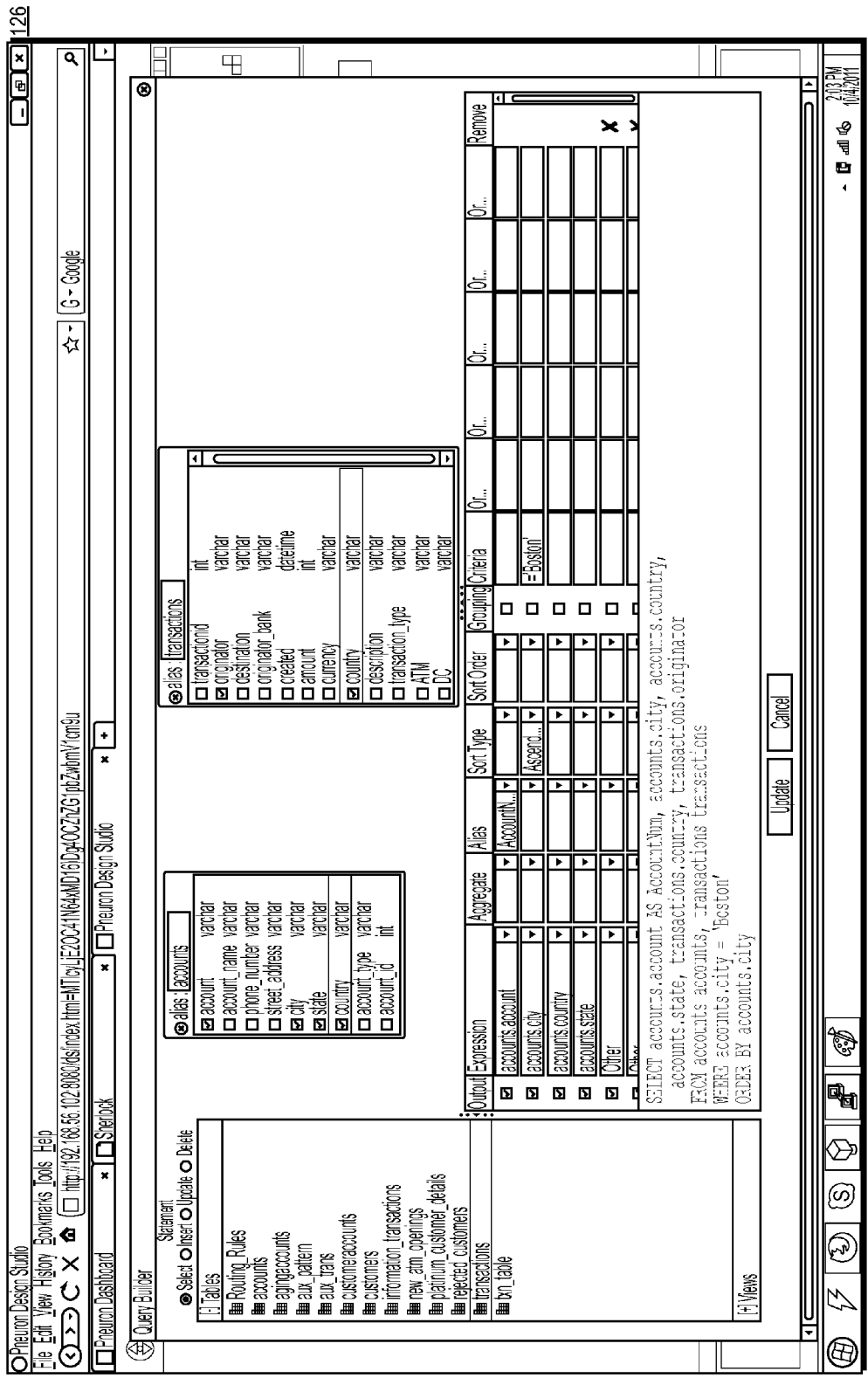
FIG. 5 is a screen shot of the analytics and rules editor according to yet another feature of the present invention.

Within the Design Studio, tailored editors for each pneuron provide ease of use in configuring data acquisition and rules processing. For example, a data acquisition editor allows users to link to target data sources, select the tables and columns and develop the queries without a deep knowledge of SQL. A screen shot of a database data acquisition editor 124 is presented in FIG. 4. Similar to the data acquisition editor, analytics and rules are also configured through an intuitive rules editor 126, as shown in FIG. 5

Figure 6:
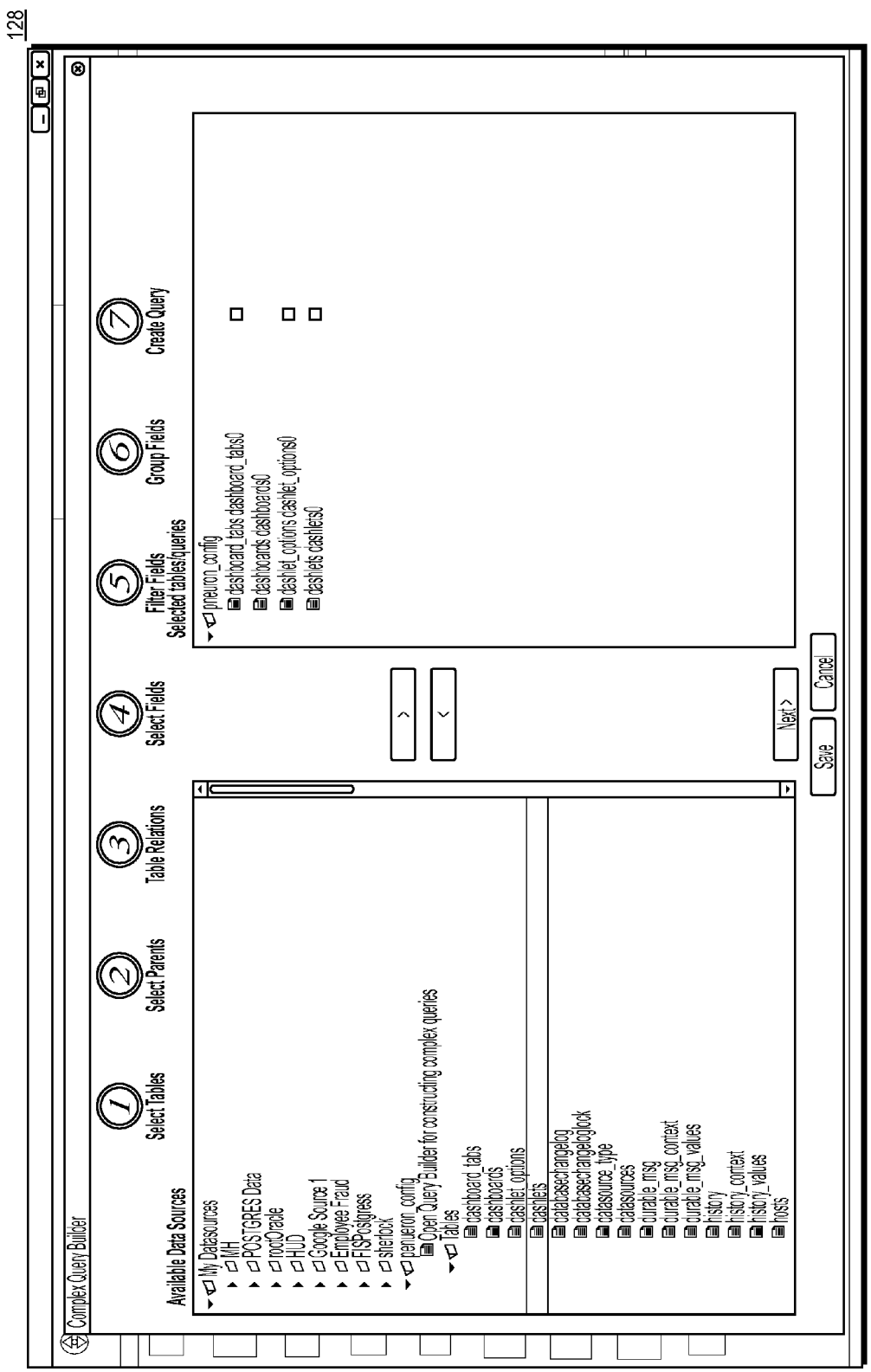
FIG. 6 is a screen shot of the reporter writer design or according to another feature of the present invention.

Additionally, the Pneuron Report Writer 128 shown in FIG. 6 also applies the "wizard" driven approach to report creation, and allows for reporting of intelligence generated by Pneuron Networks or data accessed directly from target systems. As always, organizations can choose to utilize the Pneuron Reporting tool or simply use the generated intelligence for reporting in other applications, networks, workflows or modeling products.

Robust, Flexible Data Integration Infrastructure. The Pneuron data model provides an enterprise level schema focused on managing security, cloud, Pneuron configurations, audit and logging, and evaluated intelligence data.

Figure 7:
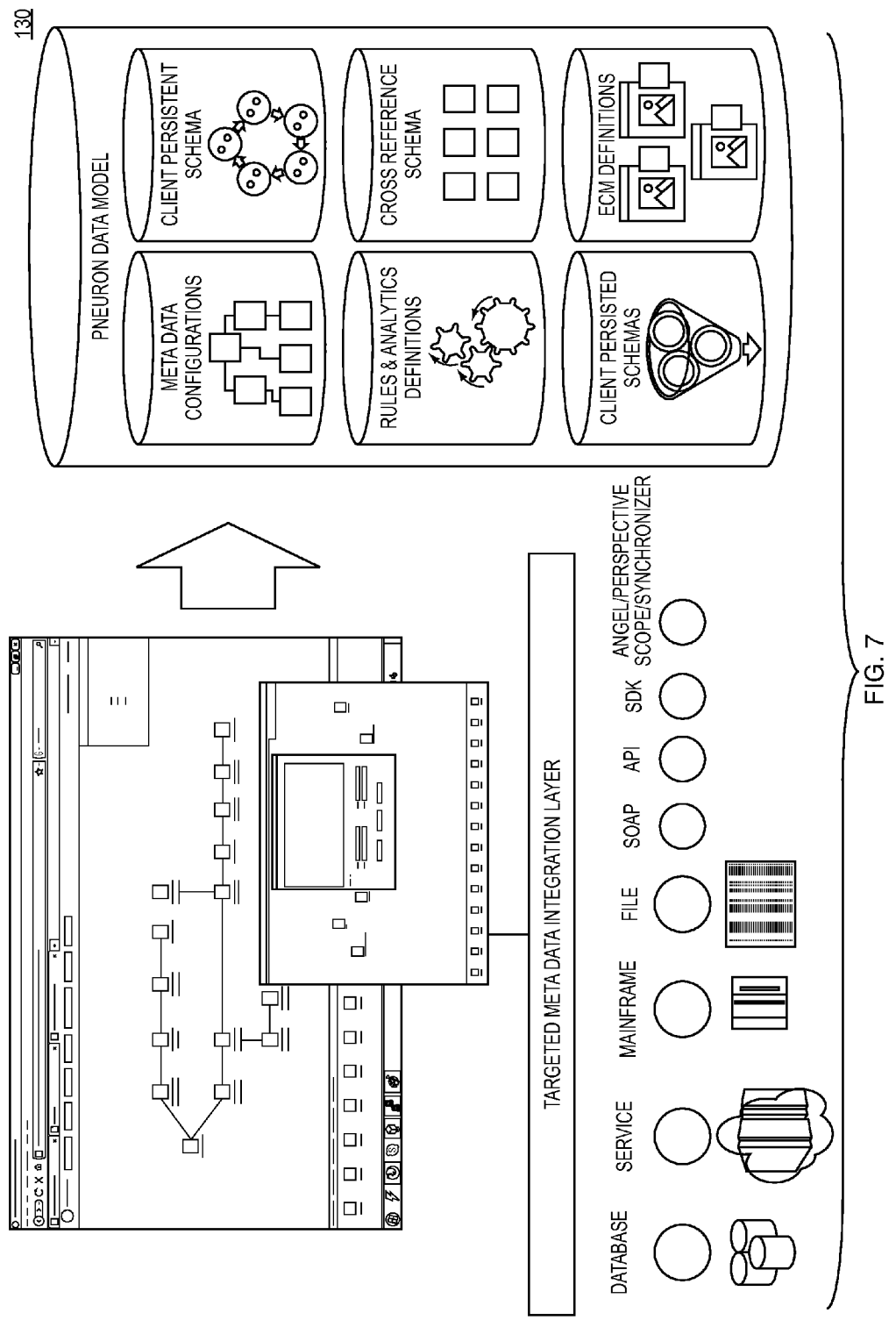
FIG. 7 is a schematic diagram of the pneuron data virtualization model according to the present invention.

A representation of a virtualized data integration and meta-data model 130 is shown in FIG. 7. A meta-data dictionary is implemented and provides the definition and processing characteristics for each data element and its associated properties. The overall data dictionary and data acquisition configuration establishes a pneuron meta-data virtualization model, which deploys one or more customized remote pneuron instances in close proximity to the target system(s) for local data acquisition and/or processing. A normalized, aggregated data model is not required. Changes to the pneuron meta-data model will automatically be synchronized across the remote pneuron instances while the meta-data mapping is aligned to the pneuron XML schema and is used for pneuron communications.

The value of the Pneuron approach disclosed and claimed herein includes the ability to wrap and apply existing integration adapters; support for major data acquisition types; selective data acquisition and mapping with meta-data definitions and structure implicitly defined and reusable; Real time acquisition and updates of information; the ability to define transient and permanent information to persist; and all acquisition managed through intuitive user interface.

Additionally, new sub-schemas can be incorporated into the present data model. Sub-schemas are custom to a specific client. An organization may elect to apply custom schemas for various business reasons including: (1) Performance optimization to maintain non-transactional reference information; (2) Critical source data that is used for time-series, comparative, or trending analysis; (3) Compliance and regulatory storage and reporting; and (4) Client preference. As the data is acquired from the pneuron processing, it is automatically updated in the custom schema.

Targeted Distributed Processing Infrastructure

Figure 8A:
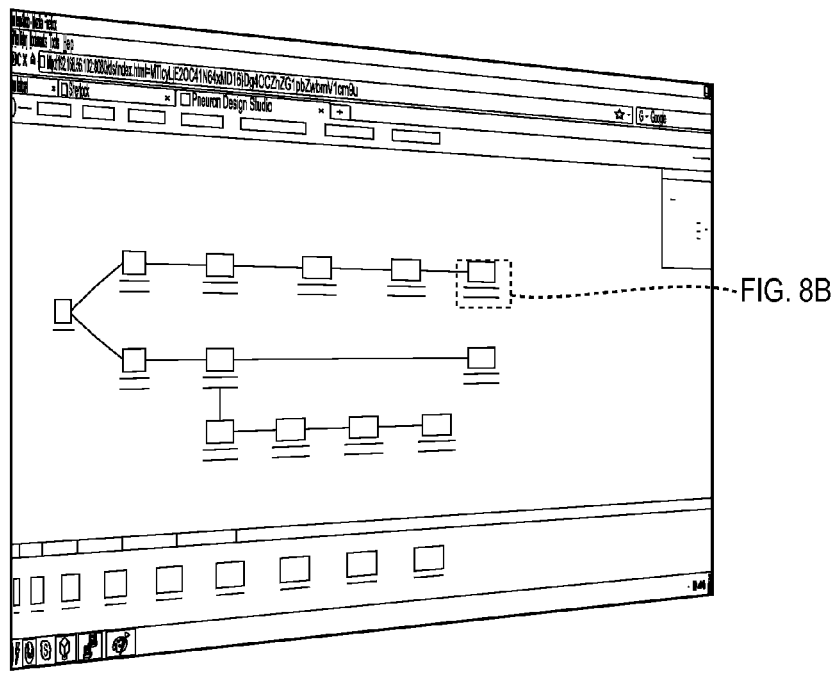
FIGS. 8A and 8B are more detailed schematic diagram of the pneuron meta data orchestration model of the present invention incorporating custom schemas and sub schemas according to one feature of the present invention.
Figure 8B:
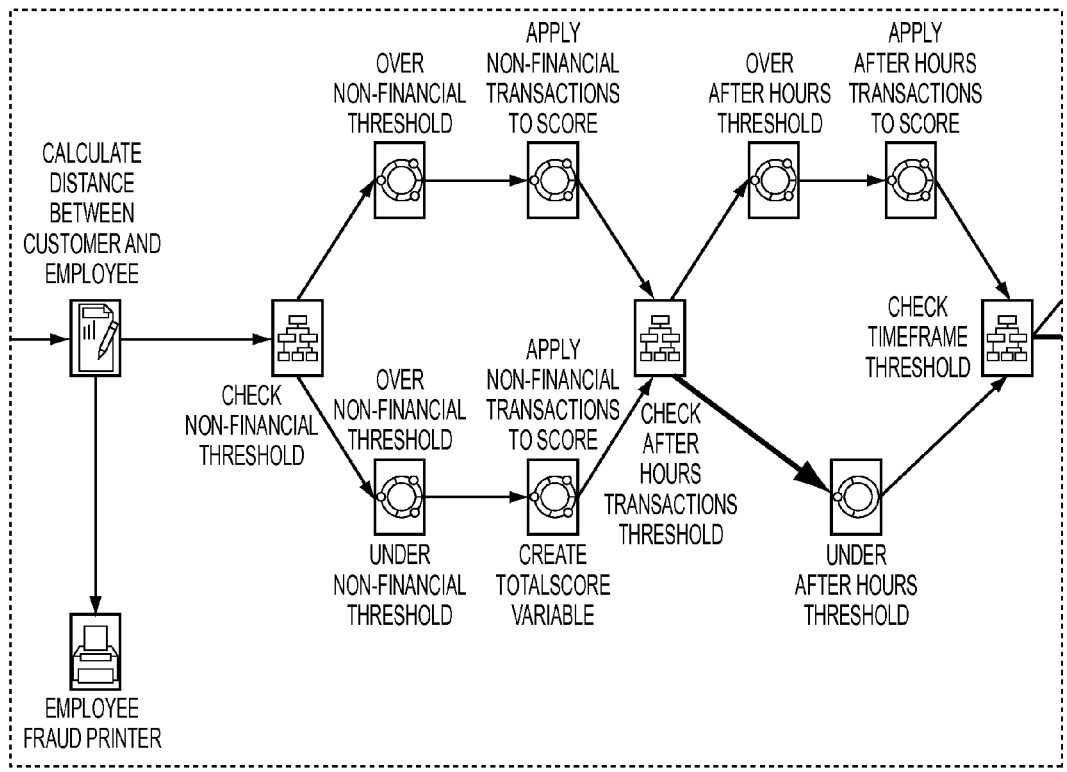

Organized Pneuron Process Models: Pneuron Networks are configured in the Design Studio and represent a collection of pneurons that are linked together to perform a series of processing steps, which can be a combination of synchronous and asynchronous functions based on the pneuron network process plan. See FIGS. 8A and 8B for example.

Figure 9:
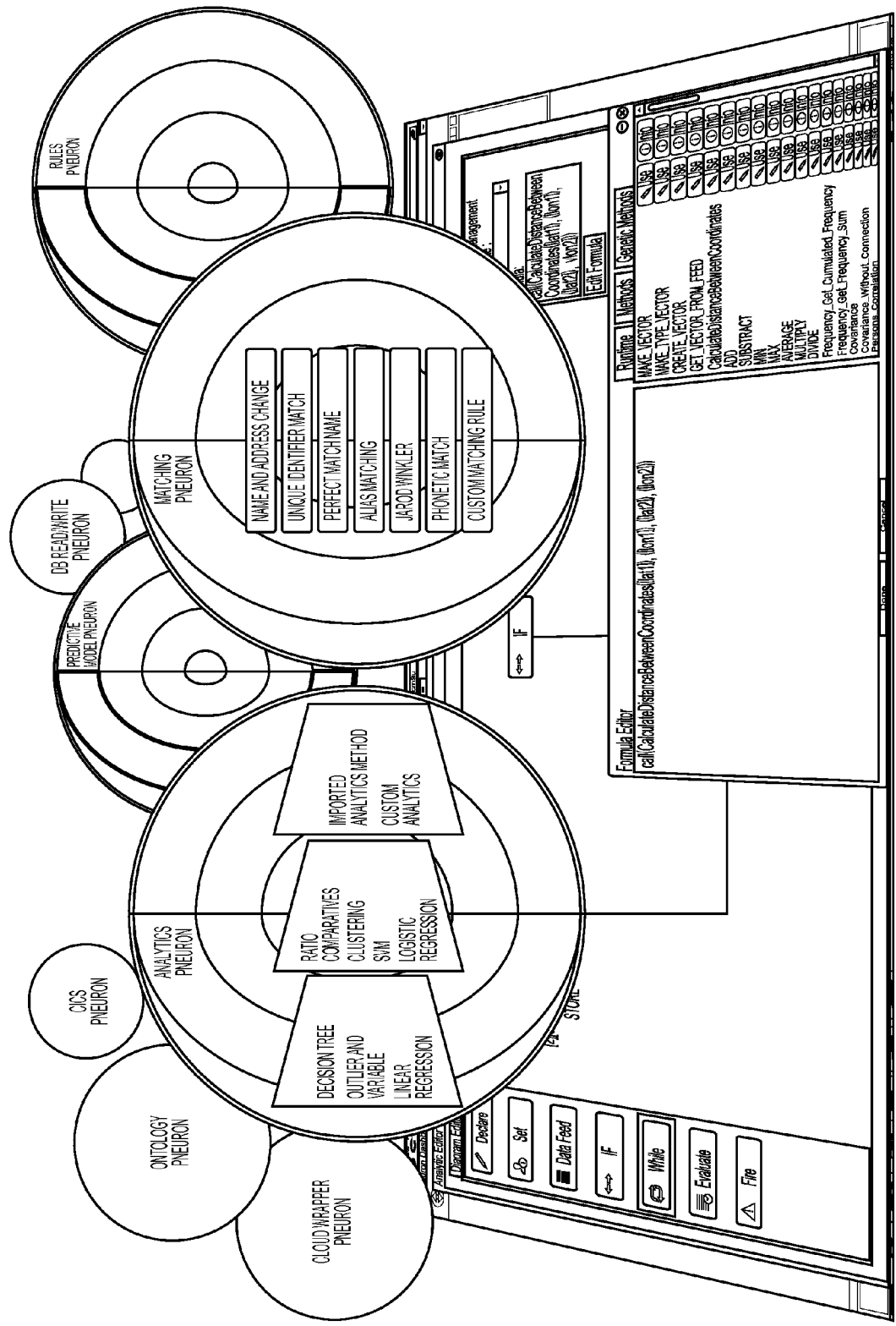
FIG. 9 is a schematic diagram of the organization of a sample pneuron network according to one feature of the present invention.

FIG. 9 is an overview of different Pneurons. Depending upon the configuration of these Pneurons, information acquired from previous Pneurons is either stored in memory or inserted into a custom Pneuron schema. Pneurons, when connected together, become aware of previous data attributes and new data derived by pneuron operations. The data attributes or tags passed between pneurons can be configured and applied in subsequent pneuron operations. Information is stored in memory is cached using either temporary in-memory tables or hash maps or maintained in distributed cache files. Relevant, acquired information is then marshaled and utilized as subsequent queries and data acquisition for different systems.

Figure 10:
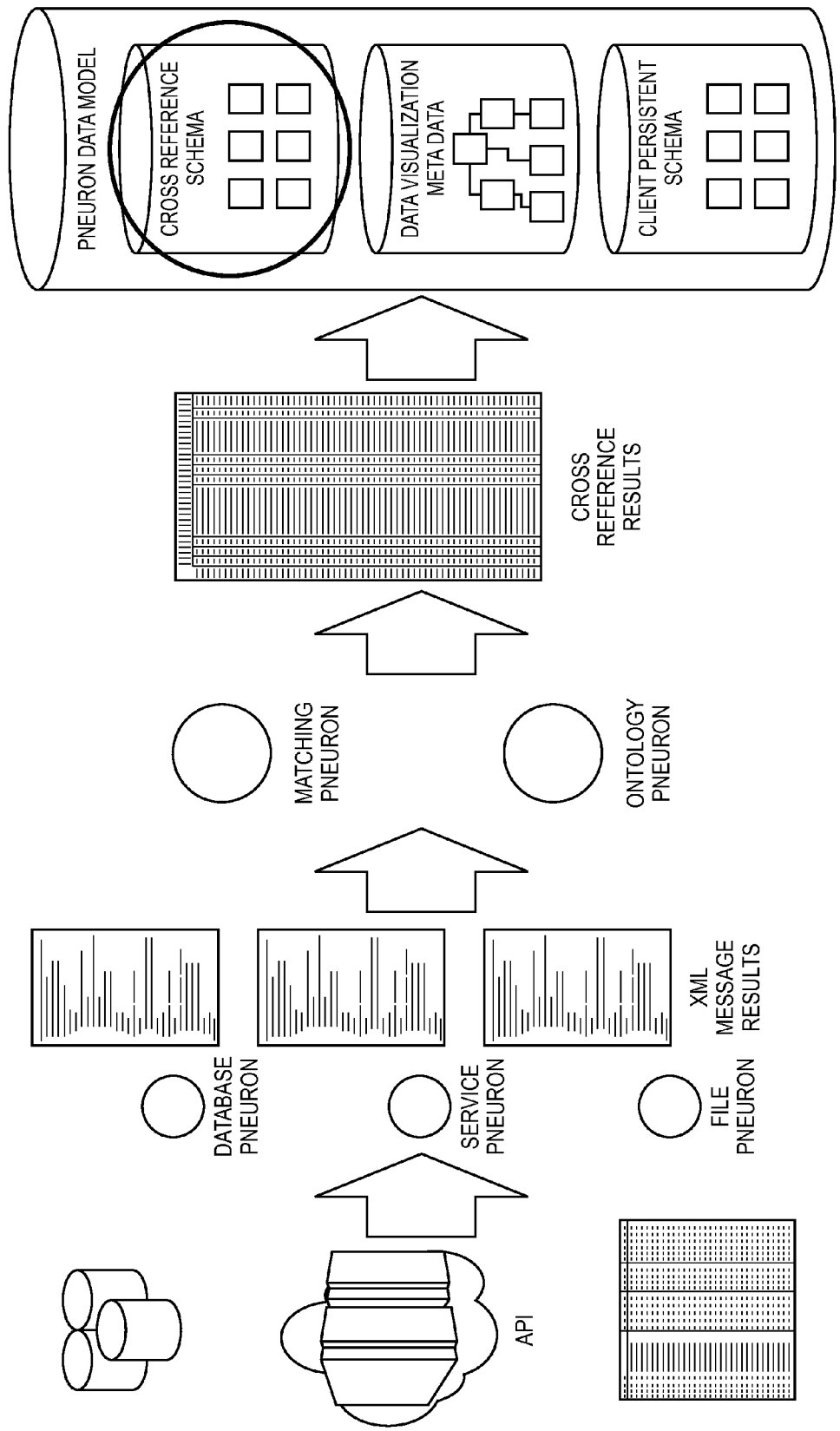
FIG. 10 is a diagram illustrating how the present invention dynamically evaluates obtained information using various pneuron types to establish cross references for "like" records across different systems.

An example is shown in FIG. 10 and involves acquiring the Customer ID and Name from one system and then launching simultaneous data acquisition requests to multiple account and transaction systems using the acquired Customer ID and Name from the first one system. These subsequent systems then return their results and are evaluated. By utilizing this approach, the present invention is able to construct (create) and maintain or persist holistic information across multiple systems and present a targeted and combined perspective of the information.

Configured Distributed Processing

As part of the configuration of distributed processing, the distributed remote Pneuron instances are configured with their specific Pneuron Network and Pneurons. The configurations are identified by their server or host identifier. This information is stored in the Pneuron data model. Using the Pneuron Deployment Manager, multiple instances of the Pneuron platform are provisioned to target servers for distribution. During the runtime Pneuron processing, a Configuration Pneuron on each remote instance manages the processing and orchestration with the various Pneurons required for the business process.

Pneuron-to-Pneuron Messaging and Communications

Pneuron messaging utilizes self-describing XML messages with the context of the message and the record set results incorporated within the message. The XML messages include context, meta-data, and acquired data. All Pneurons communicate by passing XML requests to the Pneuron cortex and remote pneuron instances, which then allocate pneurons and send the requests to pneuron for processing. The Pneuron Platform maintains an overall XML schema that is dynamically adjusted as the data dictionary and acquisition models are changed.

Powerful Matching, Analytics, and Rules

Figure 11:
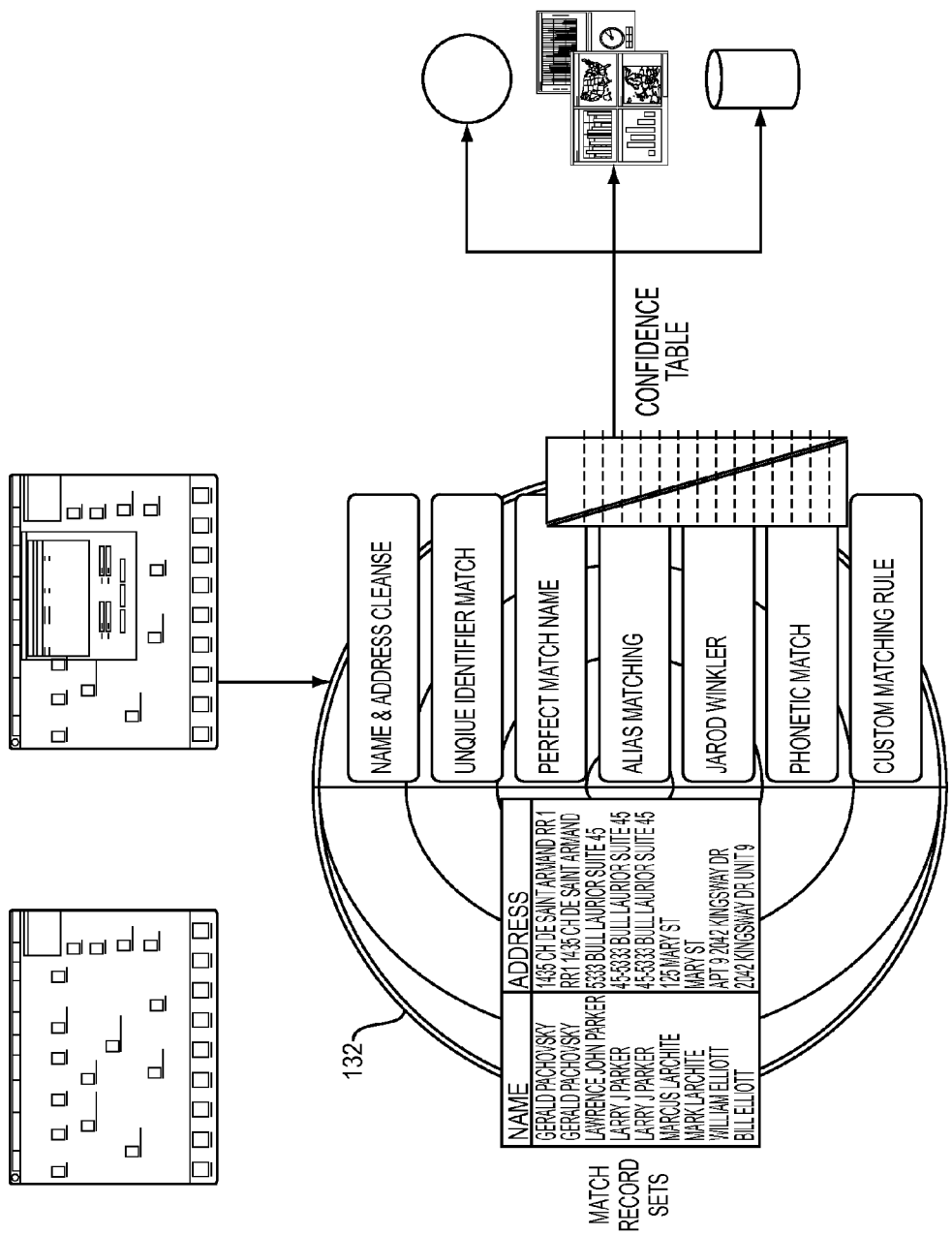
FIG. 11 is a detailed schematic view of a matching pneuron illustrating its makeup and functionality according to one feature of the present invention.

Automated Cross Referencing and Matching. A Matching Pneuron 132 (shown in greater detail in FIG. 11) is configured within the Pneuron Network and is applied to perform different matching algorithms and weighting sequences across one to multiple systems of information acquired. The Matching Pneuron enables custom rules, confidence levels, and sequencing. By combining the matching process with the acquired multi-system information, a Pneuron is able to evaluate and align records based on the criteria configured in real-time. The Matching Pneuron integrates multiple sources of data and applies multiple matching algorithms based on confidence levels. The result is the highest level of accuracy to link, reconcile and unify record sets and identification patterns. The system in method of the present invention allows a user to configure a neuron network in the design studio to create and link one or more data acquisition pneurons as well as to link dependent data sources together with he attributes. Finally, the analytical output of various pneurons may be linked together is well Easy Configuration, Distribution and Management of Rules and Analytics. The Pneuron platform is utilized to define, configure or import rules and analytics. Rules can include use cases, business functions, deviation and threshold evaluation, ad-hoc criteria, algorithms, sequencing and confidence levels, as well as configuring custom matching algorithms and other choices defined by the client. Analytics can include simple and complex math and statistics (algorithms), correlation, classifiers, and other types of analytics. A specialized Predictive Pneuron is also available for the import of scoring and predictive models. Regardless of type, all configuration information is maintained in the Pneuron data model. Rules and analytics are then simply configured to the specific Pneuron Network. As a result, different Pneuron Networks can have different rules and analytics applied. The result is a system in method which Taylor matches models and confidence levels to that required. Records may be removed as criteria is met, focusing on exceptions. In addition, the system in method provides the ability to link and apply relationships across different systems for combined match aggregation and data linkage.

The unique system and method of the invention streamlines the rules definition and management process, while providing a comprehensive suite of data acquisition, matching, rules, and analytics linked together. These definitions can be replicated for expedited creation of similar Pneuron processes across disparate business units within an organization, preserved as global library for use across the enterprise, or exported into different Pneuron instances to create focused products for an organization's clients.

There are several unique components that make up the present invention's approach to rules, analytics and modeling capabilities. One component of the present invention is the rich rules and analytics capabilities in the invention, which has integrated the Drools® runtime rules engine. Drools is considered one of the most capable rules engines available today. Users have the option of configuring their own rules within the Rules Pneuron or importing existing rules definitions from third party rules systems using the RuleML® standard. An example of the Rules Pneuron 134 is shown in FIG. 12.

Figure 12:
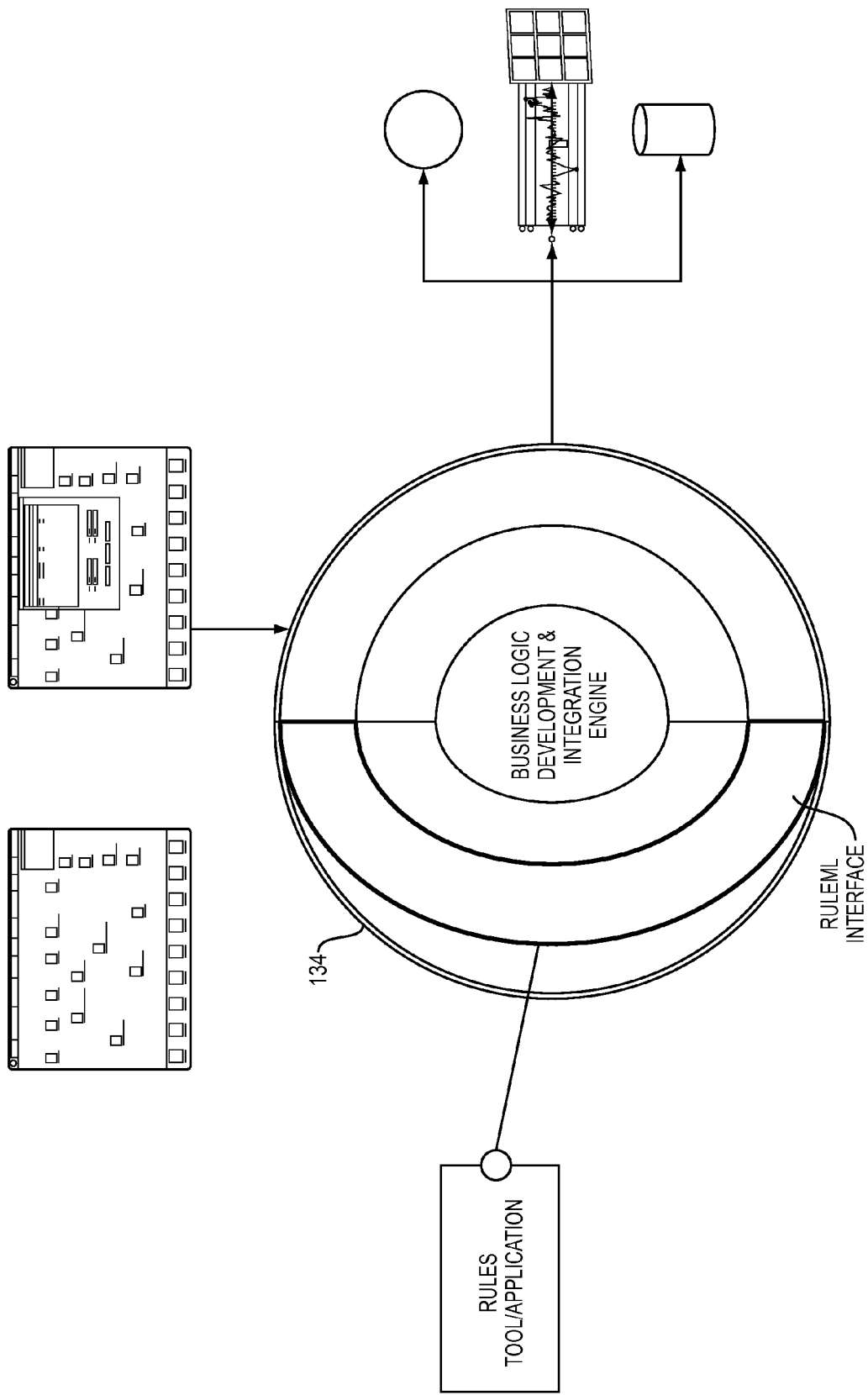
FIG. 12 is a detailed schematic view of a rules pneuron illustrating its makeup and functionality according to another feature of the present invention.
Figure 13:
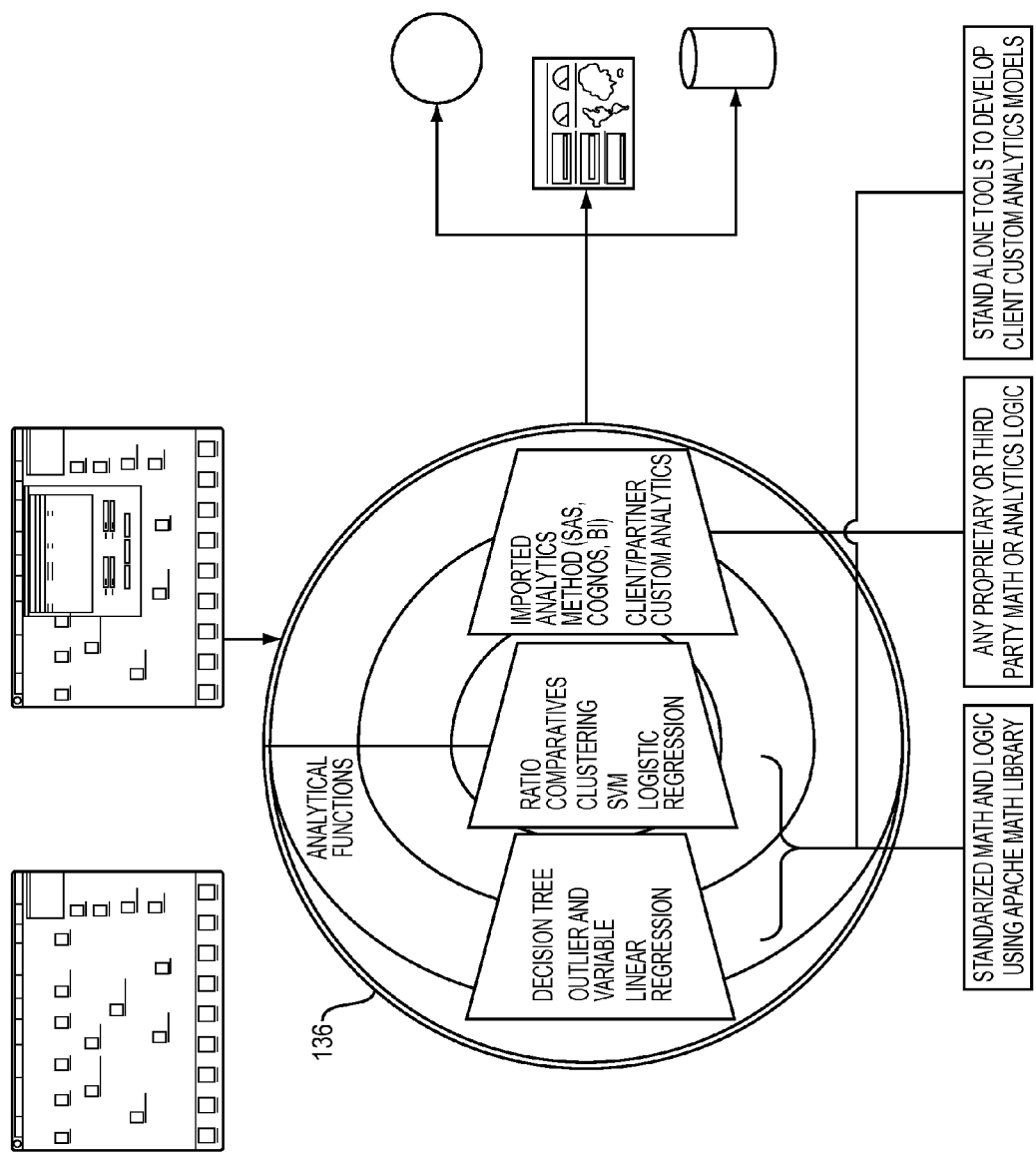
FIG. 13 is a detailed schematic view of an analytical pneuron illustrating its makeup and functionality, according to yet another feature of the present invention.

The rules pneuron shown in FIG. 12 utilizes the rules tool/application to create and link data acquisition neurons; import rule models using the RuleML standard; and configure rules in the tool editor. An embedded platform runtime rules engine will process the rules. The rules tool allows the user to create and manage rule pneurons using design studio property editor to configure rules, import rules and set thresholds or learning. The value of this feature of the invention is the ability to encapsulate use cases into configured rules; automate use cases, decision flows and outcomes based on rules evaluation; and to adapt and evolve rules based on historical performance and machine learning.

Another component of the rules and analytics capabilities of the present invention is the analytical pneuron 136, FIG.

13, which enables system users to define complete analytical models, varying from simple to highly complex.

Champion-challenger models can be applied by configuring the Pneuron Network to evaluate multiple Analytical Pneurons, with one being identified as the Champion and the secondary Analytical Pneurons as the Challengers. This approach enables fine-tuning and automated application of the best analytical results. The Analytical Pneuron is configurable in the design studio and allows the user to configure analytical models, operate on previously acquired data from pneurons, and initiate multiple simultaneous operations using the Call Pneuron. The design studio or property editor may also be used to manage the analytical pneuron and to define conditional logic; analytical functions; and to cluster neurons to maximize performance and specialize each pneuron by individual analytical function. The resulting configuration provides different analytical function configurations for each analytical pneuron providing separation of data acquisition and consolidation from decision tree and analytical functions. This allows the system user to tailor analysis specific to each model or in the performance is integrated into the user deployment methodology.

Figure 14:
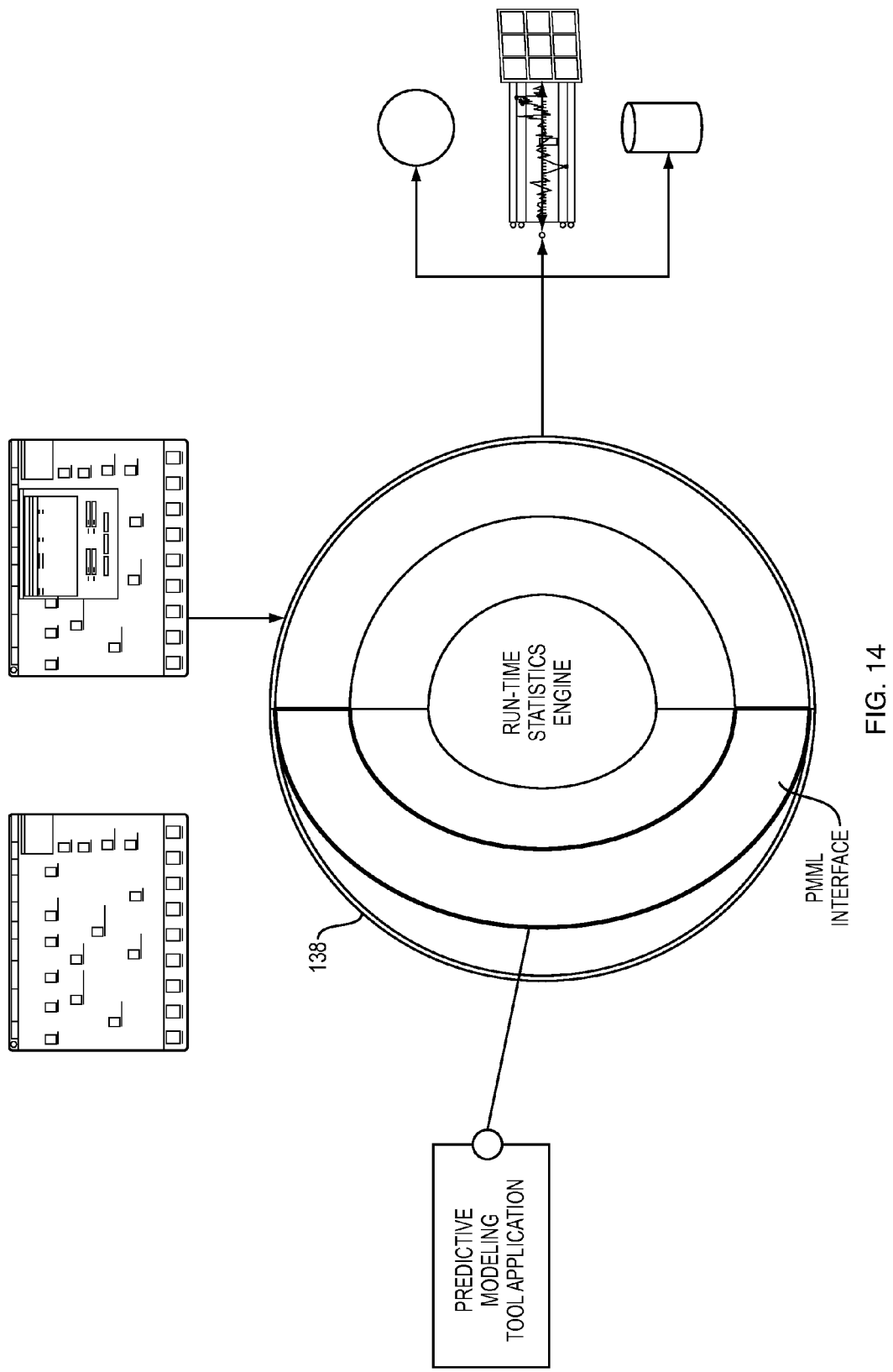
FIG. 14 is a detailed schematic view of a predictive model pneuron illustrating its makeup and functionality, according to yet another feature of the present invention.

Rounding out the sophisticated rules and analytics function within the system of the present invention is the Predictive Model Pneuron 138, FIG. 14 which enables the import of third party Predictive Model Markup Language (PMML®) standard files as well as the direct import and conversion of native SAS programs into the system of the present invention. Once the files are imported, the Predictive Model Pneuron will perform the predictive and scoring processing, utilizing information obtained from the pneurons and generating the results.

The solution provided by the present invention was developed with a single uncompromising guiding principle—eliminate the historic technological barriers that prevent organizations from functioning as a cohesive, transparent enterprise.

Pneuron's technology design delivers on this promise by removing the traditional demands and costs associated with bringing data, analytics, rules, models and results together.

Figure 15:
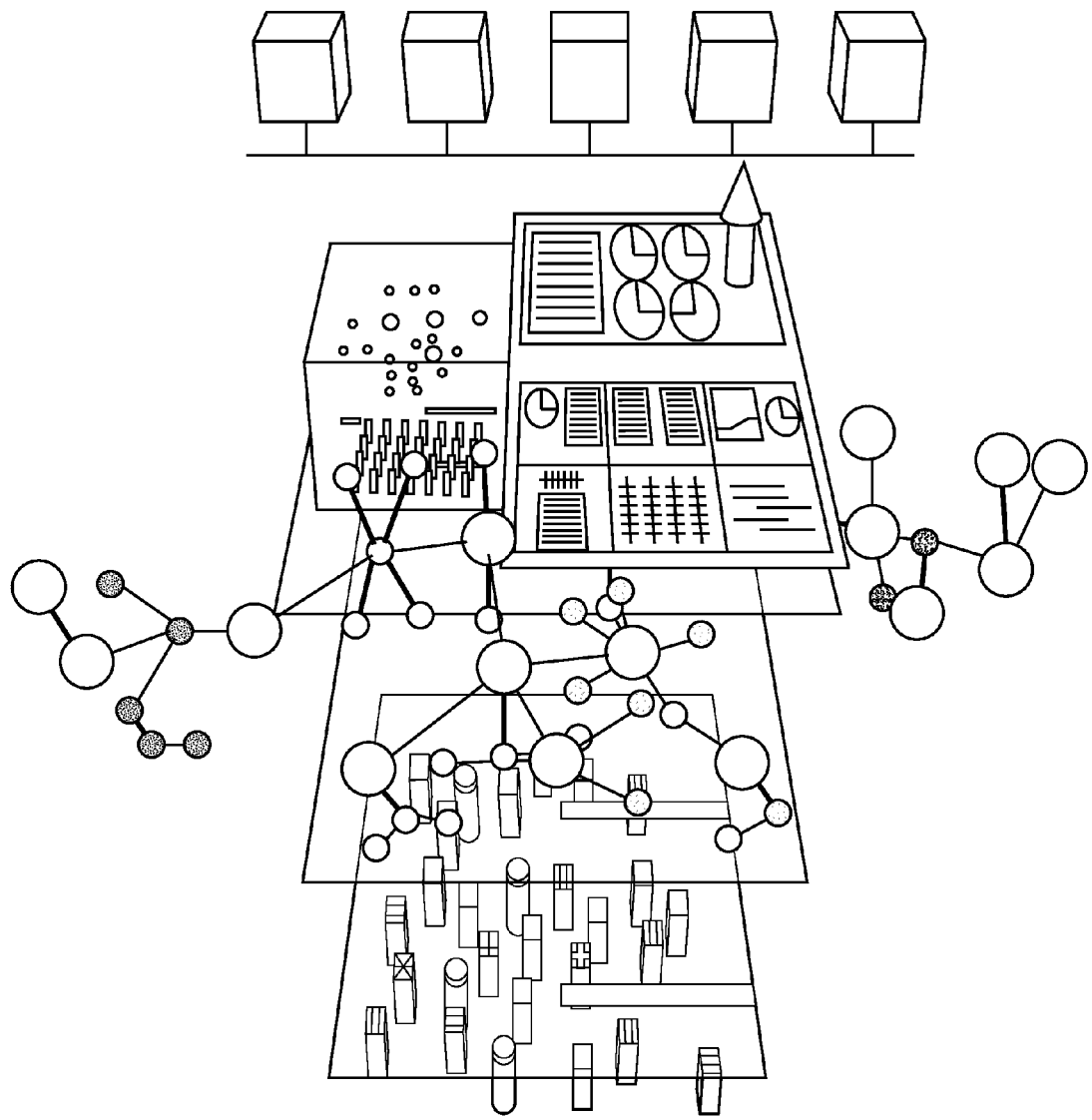
FIG. 15 is a detailed schematic view of a system-wide pneuron deployment methodology and topology implemented according to the teachings of the present invention.

The very nature of the technology manifests into a deployment model that minimizes human resource hours and maximizes speed to delivery. Combining these intrinsic delivery benefits with a deployment methodology that is as unique as its technology, Pneuron allows clients to implement Distributed Analytics solutions 140 (see FIG. 15) at a fraction of the traditional costs of most enterprise deployments.

Figure 16:
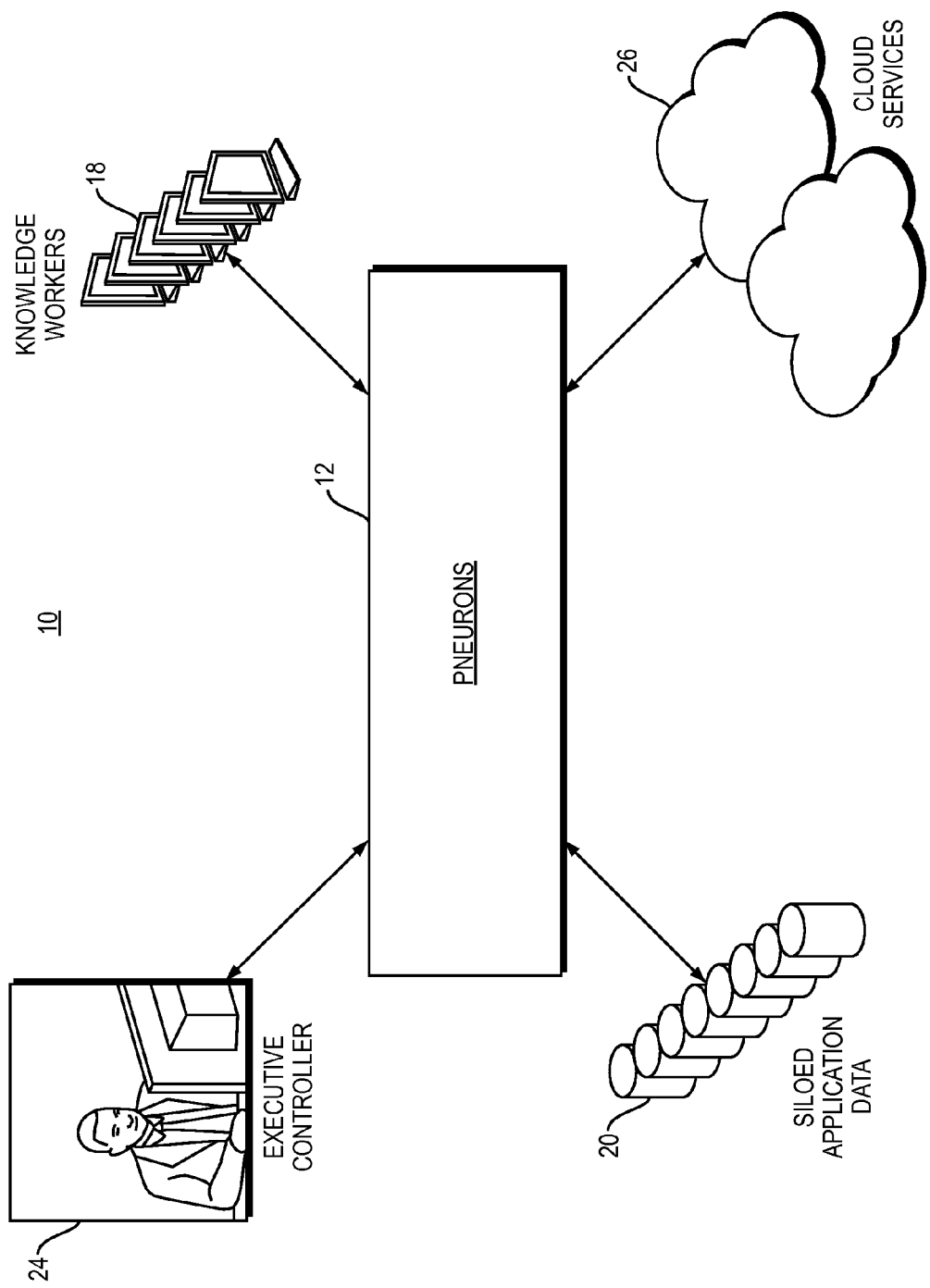
FIG. 16 is an overview of three categories of neurons utilized by the present invention.

FIG. 16 is an overview of an enterprise 10 incorporating the system and method of the present invention of utilizing pneurons, including several categories 12 of pneurons (that will be described in detail below) deployed as a comprehensive infrastructure to take control of an enterprise 10 and connect knowledge workers 18 to intelligence gathered from siloed application data 20 and or cloud services that was previously hidden from them. This is the top level generic view of the entire system.

The Data Silos 20 containing various enterprise application data use the neurons 12 (as will be described in connection with FIG. 17 below) to mine data stored in the silos 20 and/or to monitor activity logs (not shown).

The Knowledge Workers 18 (enterprise employees/users) preferably have a heads up displays (HUDs) on their desktops that bond to their proprietary enterprise applications, feeding perspective data and suggestions, such as customer heuristics, buying trends and habits, impulsiveness, sensitivity to up sell or cross sell pressure, current receivables status and history and the like to the Knowledge Workers 18. The HUD may manifest itself as an advisor window and take the form most suitable for the specific enterprise application.

Figure 17:
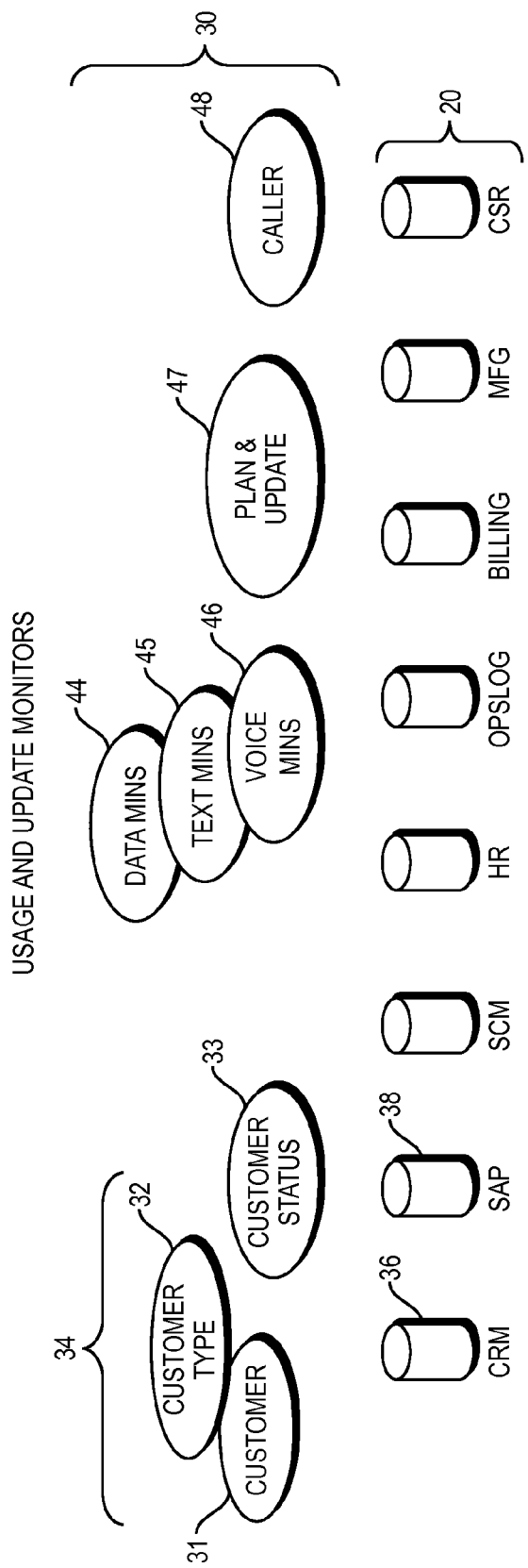
FIG. 17 depicts specific neurons in the network deployed as knowledge gatherers atop the 6databases of the siloed applications according to the present invention.
Figure 18:
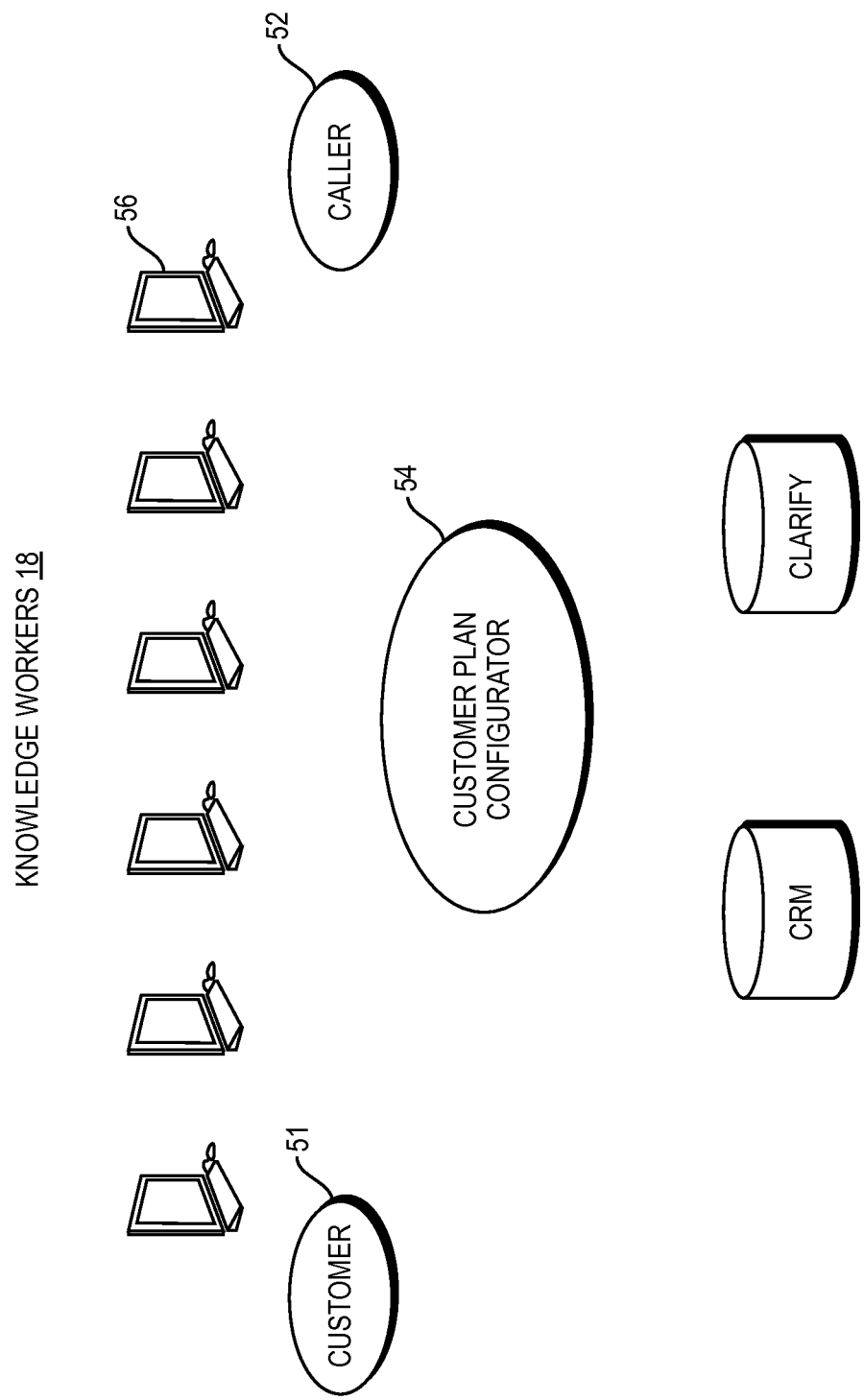
FIG. 18 illustrates perspective neurons (customer(1) and caller(2)) used to interact within the processes of existing applications in accordance with the teachings of the present invention.

The Executive Controller Module 24 is preferably implemented as software and allows the system data or enterprise data manager to create and modify policies that effect how the data monitor neurons 30, FIG. 17 and Application Interception neurons 51 and 52 FIG. 18 act, how the knowledge worker HUDs work, and reports on effectiveness of policies on a near-real time basis.

Cloud computing is a style of computing in which dynamically scalable and often virtualized resources are provided as a service (i.e. Cloud Services) over the Internet. Cloud computing is a general term for anything that involves delivering hosted services over the Internet. These services are broadly divided into three categories: Infrastructure-as-a-Service (IaaS), Platform-as-a-Service (PaaS) and Software-as-a-Service (SaaS). The name cloud computing was inspired by the cloud symbol that's often used to represent the Internet in flowcharts and diagrams.

A cloud service has three distinct characteristics that differentiate it from traditional hosting. It is sold on demand, typically by the minute or the hour; it is elastic—a user can have as much or as little of a service as they want at any given time; and the service is fully managed by the provider (the consumer needs nothing but a personal computer and Internet access). Users need not have knowledge of, expertise in, or control over the technology infrastructure in the "cloud" 26 that supports them. Cloud services are available, for example, from Microsoft Corporation, Amazon, Force.com, and a few others. The present invention is agnostic about programming languages, operating system environments, web application servers, and most technical choices made by an IT organization in the past. The invention is also indifferent as to the source of information that can be used to distill business actionable intelligence.

Most large global companies have no need for Cloud Services. They have already invested heavily in highly customized Enterprise Software. As you move down the chain to smaller than global entities, however, the need for software as a service, due to the lack of investment in a critical area of enterprise software, begins to emerge. Cloud Services 26, in effect, opens the flood gates of raw information to the smaller business, effectively flooding them, the way global enterprises are flooded with their own proprietary data.

The system 10 of the present invention can be implemented to assimilate information from any source, introducing its relevance to a business' business model in real time, and stimulating any automated activity deemed important by the executives of the business.

FIG. 17 depicts specific neurons in the network deployed as knowledge gatherers atop the siloed application data 20. The first category of neurons includes data farmers or condition monitors 30. In the example of a mobile telephone carrier, the carrier has determined that they must regain lost market share while the economy is down. To do this, they must know their customers better. Assigning a customer to a taxonomy (cust_type) (32) does not mean that the customer is impervious to the pressures associated with other drivers. For instance, an affluent customer, lost to AT&T because of the iPhone, will be categorized as driven by having the latest toy. It doesn't infer that they wouldn't be moved by an unsolicited call, offering to change their plan to accommodate and eliminate a $500 overcharge this month for unplanned minutes spent by one of their children overspending their text allocation in their first month of College. This taxonomy is used to direct the CSR (Customer Service Rep) toward the 'deal sweeteners' with the highest appeal. There is no reason why this has to be a singular taxonomy. It might be wise to capture a hierarchy of "drivers" that will uniquely identify the customer's spending characteristics rather than group them. The one or more monitors or neurons 34 on or associated with the business' CRM system 36 will gather the information from the Ops Log History and report the changes to the one or more neurons 34. The neuron 34 receives the message, updates its state and evaluates the message based on its rules. If the execution rules are met, the neuron notifies the heads up display of the knowledge worker 18 (FIG. 1) with a prescribed message which is conveyed through the user experience to the knowledge worker 18 along with prescribed recommendations associated with the condition described in the message. The term User eXperience (UX) is in common usage today. It is a higher abstraction of the User Interface (UI) or Graphical User Interface (GUI). It addresses the entire user experience, including the incorporation of telephones or additive, advisory displays like the HUD. For example, if the customer has been categorized as an impulse purchaser who is driven by the need to have the latest toy, the system will advise that the new plan that the enterprise is trying to sell them may include a new phone that is not yet available but would be included in the new plan.

The customer neuron 31 is a state condition set by either the sales guy in the CRM system, a workflow that sets this state to 'focused', or the engagement of a CSR by phone, chat, twitter, or other contact initiated by the customer.

The customer status neuron 33 holds the financial state of the current customer in focus. The complexity of this neuron will vary from client to client. The simplest version is that the customer status neuron 33 on top of the Systems, Applications and Products (SAP) 38 will query and maintain status changes for all customers in a binary fashion. 1=status good, 0=status delinquent. In the more sophisticated versions, a business may engage cloud services to track changes in their credit score, current credit card balances, or whatever to determine up-sell capacity.

The Caller neuron (48) is set with the Unique Identifier (UID) of the customer who has just initiated contact with the business, assuming it has come from a passive source like the Web. This may also be set in the case of a phone call to a Customer Service Rep.

The Plan neuron (47) maintains the meta-data based a description of the Customer's current plan, including renewal date. In this simplified model, plans are made up of the monthly limits associated with only three elements, Data surfing minutes using the customer's device as a browser, Text Messaging Minutes, and Voice telephony minutes.

Within the neuron are stored Metadata rules that are unique and specific to its purpose. In the case of a monitor neuron, the variable or data name is stored as the element to be monitored. This data name is specific to the data schema of the database being monitored by said neuron. For example, in the mobile telephony example, a neuron could be created to monitor the customer's current accumulated number of text messages in the current billing period. This value is compared whenever it changes to the limit of the customer's plan. The Executive Control Model will have determined the rule to apply to the comparison. The simplest rule would be that if the amount of messages exceeded the limit by a certain amount, the rule would fire the SPU to change the state of the neuron, construct a message and transmit the message to another neuron (that may be monitoring a related condition) or transmit the message to the workflow initiation module of the CRM (Sales) system that would create a workflow that would show up in the in basket of the account representative who owned this customer account.

With the customer set as focus or perspective, the data, text and voice minutes neurons (44, 45, and 46) maintain the current state of these three dimensions of standard plans. They have, built within their metadata rules, proximity alarms that will change their state from normal to concerned and to critical. These changes are triggered within the specific customer's instance as the data changes within the customer usage log. The Executive control system 24 sets and manages these thresholds on a real time basis, thus controlling when an action or event is fired; for instance, contact the customer with a relief plan.

FIG. 18 illustrates perspective neurons (customer (51) and caller (52)) used to interact within the processes of existing applications enhancing the quality of decision making on the part of the knowledge worker.

Knowledge Workers 18 run the client side of enterprise applications. They include sales and customer service representatives, although they are far from limited to these individuals. We will focus on them since they represent the customer facing side of a business' business model; however it is understood that the present invention can be utilized by or implemented on behalf of various individuals having various titles and responsibilities within a given organization.

This also introduces the 'transaction (or application) interception' class of neurons 51, 52 and 54. As a call is received, the caller is identified within the Customer Service Application and the perspective neuron is set to that ID. The 'transaction or application interception' neurons 51, 52 and 54 interact with their farmer/monitor counterparts (neurons 31 through 46 in FIG. 2) in the same network. Their primary function is to intercept transaction data on the fly from siloed application data 20 and to feed the knowledge worker useful intelligence at just the right time.

In this simplified illustration, we see the desktops 56 of the sales and customer service knowledge workers 18. They are primarily running instances of Siebel and Clarify Enterprise software systems. The difference is that their perspective is set by in-coming calls for help (caller) (mostly unless an outgoing policy is created in the executive controller for the Clarify users) and the customer in the out-bound call work packet in Siebel.

The present invention sets the knowledge worker's 18 perspective based on one of these neural states for that user's desktop. All associated intelligence is displayed in the Heads Up Display (HUD) along with any rules imposed by programs in place as dictated by the executive control system 24. This includes special offers, early previews of new phones, forgiveness of overage in exchange for a new 2 year contract, etc. This HUD acts as a business development, intelligent advisor that knows all about what information the business executives are willing to give up to expand the business. In this case, it can create a custom plan for each customer and feed it to the representative and Billing system. Any forgiveness of debt will have to be forced as an override to the billing system and to the SAP system. This is accomplished automatically within the neural net by triggering update neurons 47 that fire additional transactions with acknowledgements.

Figure 19:
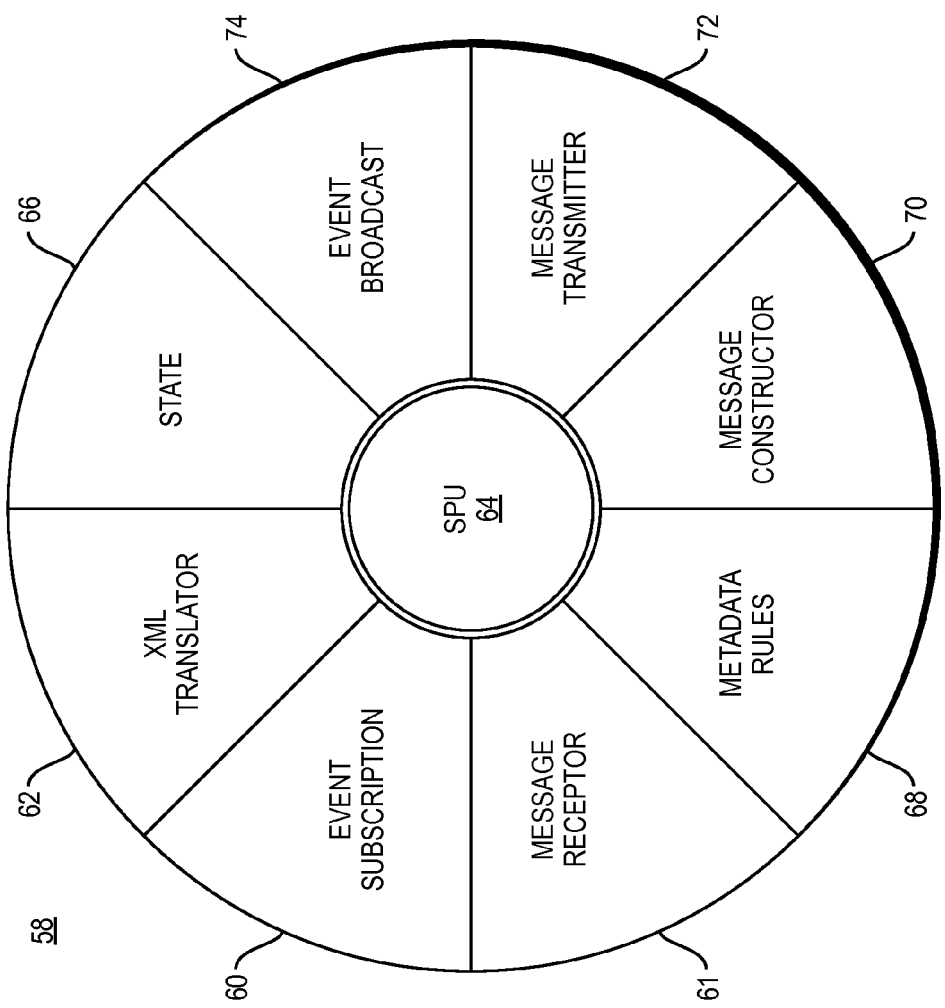
FIG. 19 is a diagram of a business intelligence neuron according to the present invention.

FIG. 19 is a diagram of a generic business intelligence neuron 58 explaining its components and how it fulfills its purpose. A neuron is a software object that contains seven (more or less) primary methods or tasks. It is capable of interacting within the neural network in a number of ways. There are many types of neurons, but they all share this common prototypical construction.

The neurons are all generally capable of subscribing to and receiving notification of system events, 60 and receiving messages 61; they are all capable of parsing XML messages and compiling them to the binary form recognizable by the SPU, 62; they are all based on a 'soft processing unit' or spu, 64 (this the neural network equivalent of a CPU in a computer, it can process a stream of binary codes and perform it's primary purpose once it receives the appropriate code stream); they are all capable of setting and preserving their state, 66 (the state is persistent, similar to SRAM); they are all capable of storing a metadata based rules matrix 68 that will determine whether or not the primary function is executed and in what way, (the primary function is expressed as some combination of state setting, Message construction 70, Message Transmission 72, and event broadcast 74); and they are all capable of constructing outgoing messages and of transmitting outgoing messages to the enterprise message bus or to a list of neuron receptors 70, 72 and 74.

The unique instance of a neuron is defined by its rules, perspective and focus. Perspective is the target of its core purpose. An example of perspective is customer. The depth dimension of a neuron may be viewed as instances tracking individual customers. This can be visualized as a 'stack' of neuron clones with most elements held consistent across instances, but some like 'state' stored uniquely.

It is the nature of a neuron to be extremely small, simple and provide very simple processing, but as part of a complex network of inter-reactive neurons they can be assembled to serve much more complex purposes.

The primary target for neural network enhancement is a company that has already seen the value in breaking down the walls of siloed applications to enhance the performance of knowledge workers in mission critical functions. The invention is designed to anneal to an existing IT infrastructure without regard to programming language, operating system, or communication technology.

In the perfect implementation, the company will have already deployed Enterprise Applications pertinent to their business model within their industry along with an Enterprise Message Bus, like TIBCO for example.

The neural consultants will focus on understanding the 'best practices' published for the company's industry, and determine where the most leveraged processes exist within the company. They will then model the existing system in the Executive Controller Simulator. This model is then shared with the executives of the company. The neural network consultants then poke and probe the executives deepest desires for the way that they would like the company to perform. Adjustments are made to the model, and the consultants begin to build out the neural network to support the model in the simulator.

This process includes building adaptors, standard services interfaces built on top of the application databases, where necessary for the databases of existing systems, creation of permissions across the various applications to be connected to the neural network, interceptor agents, as described in FIG. 18, for the targeted mission critical applications to be enhanced, and the design and implementation of custom HUDs (Heads Up Displays) designed to interact with the knowledge workers of the designated mission critical applications. Finally, any deficiency in the distributed neural network deemed important to fill by the operational executives that can be supplemented by available software services made available by any of the cloud computing vendors (AMAZON, Microsoft, Force.com, etc) will be provided by cloud computing neurons created to monitor information retrieved from the cloud services provider. These neurons react and interact with the network like any other neuron within the system, giving the company the power to automatically react to conditions outside of its proprietary data centers, like changes in the prognosis of future activities within an industry as predicted by Forrester or Gartner, or changes in and industry subsection of the S&P 500.

When the neural network is ready, the executive controller releases the current metadata to the neurons within the IT infrastructure which activates them. From this point on, the IT infrastructure of the company is forever bonded to the will of the executives as expressed by them through the executive controller 24. New pricing can be rolled out from here; new sales programs with incentives can be created here; modifications of policies will be rolled out from here in real time and can be changed from moment to moment, giving operational executives real-time agility into the controls of their company.

Modifications and substitutions by one of ordinary skill in the art are considered to be within the scope of the present invention, which is not to be limited except by the allowed claims and their legal equivalents.

The invention claimed is:

1. A distributed analytics method utilizing an automated, computerized system for creating, editing, modifying and deploying one or more computer software pneurons for seamless deployment to one or more existing system in order to acquire, review and analyze targeted information from said one or more existing system, the distributed analytics method comprising the acts of:

deploying one or more data acquisition pneurons to a target system including data to be reviewed and acquired, said data acquisition pneuron configured for acquiring data using a selective targeted approach, wherein the data acquisition is organized by data type, data location, including database, application programming interface or service interaction, and file;

deploying one or more data interrogating pneurons to said acquired data, for analyzing the acquired data on said one or more existing system, wherein said one or more interrogation pneurons are configured to operate and use existing hardware where the acquired data is located;

deploying one or more meta-data pneurons, said one or more meta-data pneurons configured for creating, designing and implementing a meta-data dictionary, wherein the meta-data dictionary provides definition and processing characteristics for each acquired data element;

deploying one or more analytical pneurons, said one or more analytical pneurons configured for running analysis and/or predictions on the acquired data at the source of the data, without moving the data from the source, said one or more analytical neurons configured for evaluating the acquired data in real time and for providing a user with generally immediate visualization of results;

deploying one or more predictive model pneurons, said one or more predictive model pneurons configured for applying changes to one or more of said data acquisition, data interrogating, metadata or analytical pneurons, in order to recast and evaluate or re-evaluate the same or different data; and deploying one or more data storage pneurons, said one or more data storage pneurons configured for storing results and acquired data in a database, wherein the database can be exported and applied, thereby stimulating constant enterprise intelligence.

2. The method of claim 1, wherein said one or more data acquisition pneurons include one or more of a database pneuron, a service pneuron and a file pneuron.

3. The method of claim 1, wherein said one or more data interrogating pneurons includes one or more rules pneurons.

4. The method of claim 1, wherein said one or more data acquisition pneurons, said one or more data interrogating pneurons, said one or more metadata pneurons, said one or more analytical pneurons, said one or more predictive model pneurons and said one or more data storage neurons are prearranged into a predetermined pneuron network.

\* \* \* \* \*